(12) United States Patent
Palmer

(10) Patent No.: US 11,341,825 B1
(45) Date of Patent: May 24, 2022

(54) IMPLEMENTING DETERRENT PROTOCOLS IN RESPONSE TO DETECTED SECURITY EVENTS

(71) Applicant: Amazon Technologies, Inc., Seattle, WA (US)

(72) Inventor: Koltyn Chiaro Palmer, Denver, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/001,322

(22) Filed: Aug. 24, 2020

Related U.S. Application Data

(63) Continuation of application No. 16/151,767, filed on Oct. 4, 2018, now Pat. No. 10,755,537.

(51) Int. Cl.
| | |
|---|---|
| *G08B 21/00* | (2006.01) |
| *G08B 5/38* | (2006.01) |
| *G08B 3/10* | (2006.01) |
| *G08B 13/196* | (2006.01) |
| *H04N 7/18* | (2006.01) |

(52) U.S. Cl.
CPC .............. *G08B 5/38* (2013.01); *G08B 3/10* (2013.01); *G08B 13/19602* (2013.01); *H04N 7/185* (2013.01)

(58) Field of Classification Search
CPC ...... G08B 5/38; G08B 3/10; G08B 13/19602; H04N 7/185
See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |

(Continued)

OTHER PUBLICATIONS

Office Action for U.S. Appl. No. 16/151,767, dated Feb. 13, 2020, Palmer, "Implementing Deterrent Protocols in Response To Detected Security Events", 11 Pages.

(Continued)

*Primary Examiner* — Julie B Lieu
(74) *Attorney, Agent, or Firm* — Lee & Hayes, P.C.

(57) ABSTRACT

Various deterrent protocols may be defined and implemented for lights and/or speakers located at a property. For example, in response to a detected security event, e.g., detected motion on or near the property, a first action defined by a deterrent protocol may be instigated by a security system. The first action may be, for example, activating one or more light emitters in a steady state mode, e.g., a continuous on mode, or a non-steady state mode, e.g., a flashing pattern. If after a predetermined amount of time, the security event is still detected, based upon the deterrent protocol, a second action may be instigated. The second action may include changing the mode of the light emitted by the one or more light emitters. In embodiments, the first or second action may include activating a speaker to emit audio.

20 Claims, 12 Drawing Sheets

(56) References Cited

U.S. PATENT DOCUMENTS

| | | | |
|---|---|---|---|
| 6,476,858 B1 | 11/2002 | Ramirez Diaz et al. | |
| 6,633,231 B1 | 10/2003 | Okamoto et al. | |
| 6,658,091 B1 * | 12/2003 | Naidoo | H04M 11/04 379/37 |
| 6,753,774 B2 | 6/2004 | Pan et al. | |
| 6,970,183 B1 * | 11/2005 | Monroe | G08B 7/062 348/143 |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,193,644 B2 | 3/2007 | Carter | |
| 7,304,572 B2 | 12/2007 | Sheynman et al. | |
| 7,382,249 B2 | 6/2008 | Fancella | |
| 7,450,638 B2 | 11/2008 | Iwamura | |
| 7,643,056 B2 | 1/2010 | Silsby | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 8,139,098 B2 | 3/2012 | Carter | |
| 8,144,183 B2 | 3/2012 | Carter | |
| 8,154,581 B2 | 4/2012 | Carter | |
| 8,619,136 B2 | 12/2013 | Howarter et al. | |
| 8,780,201 B1 | 7/2014 | Scalisi et al. | |
| 8,823,795 B1 | 9/2014 | Scalisi et al. | |
| 8,842,180 B1 | 9/2014 | Kasmir et al. | |
| 8,872,915 B1 | 10/2014 | Scalisi et al. | |
| 8,937,659 B1 | 1/2015 | Scalisi et al. | |
| 8,941,736 B1 | 1/2015 | Scalisi | |
| 8,947,530 B1 | 2/2015 | Scalisi | |
| 8,953,040 B1 | 2/2015 | Scalisi et al. | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Kasmir et al. | |
| 9,094,584 B2 | 7/2015 | Scalisi et al. | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi et al. | |
| 9,179,108 B1 | 11/2015 | Scalisi et al. | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,230,424 B1 | 1/2016 | Scalisi et al. | |
| 9,237,318 B2 | 1/2016 | Kasmir et al. | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,508,239 B1 | 11/2016 | Harrison et al. | |
| 9,613,524 B1 * | 4/2017 | Lamb | G08B 29/185 |
| 9,736,284 B2 | 8/2017 | Scalisi et al. | |
| 9,743,049 B2 | 8/2017 | Scalisi et al. | |
| 9,769,435 B2 | 9/2017 | Scalisi et al. | |
| 9,786,133 B2 | 10/2017 | Harrison et al. | |
| 9,799,183 B2 | 10/2017 | Harrison et al. | |
| 9,839,267 B1 * | 12/2017 | Gharabegian | G06F 3/167 |
| 2002/0094111 A1 | 7/2002 | Puchek et al. | |
| 2002/0147982 A1 | 10/2002 | Naidoo et al. | |
| 2003/0043047 A1 | 3/2003 | Braun | |
| 2004/0085205 A1 | 5/2004 | Yeh | |
| 2004/0085450 A1 | 5/2004 | Stuart | |
| 2004/0086093 A1 | 5/2004 | Schranz | |
| 2004/0095254 A1 | 5/2004 | Maruszczak | |
| 2004/0135686 A1 | 7/2004 | Parker | |
| 2005/0111660 A1 | 5/2005 | Hosoda | |
| 2006/0010199 A1 | 1/2006 | Brailean et al. | |
| 2006/0022816 A1 | 2/2006 | Yukawa | |
| 2006/0132322 A1 | 6/2006 | Jackson | |
| 2006/0139449 A1 | 6/2006 | Cheng et al. | |
| 2006/0156361 A1 | 7/2006 | Wang et al. | |
| 2007/0008081 A1 | 1/2007 | Tylicki et al. | |
| 2010/0225455 A1 | 9/2010 | Claiborne et al. | |
| 2013/0057695 A1 | 3/2013 | Huisking | |
| 2014/0266764 A1 * | 9/2014 | Henrie | G08B 5/38 340/691.1 |
| 2014/0267716 A1 | 9/2014 | Child et al. | |
| 2015/0035987 A1 | 2/2015 | Fernandez | |
| 2015/0163463 A1 | 6/2015 | Hwang et al. | |
| 2015/0302728 A1 * | 10/2015 | Gettings | G08B 3/10 340/506 |
| 2017/0162007 A1 * | 6/2017 | Boyd | G08B 17/117 |
| 2018/0199683 A1 * | 7/2018 | Gharabegian | G08B 3/10 |
| 2018/0233010 A1 * | 8/2018 | Modestine | G08B 13/19671 |
| 2018/0240322 A1 * | 8/2018 | Potucek | E04H 4/14 |
| 2018/0322745 A1 * | 11/2018 | Sloo | F24F 11/33 |
| 2019/0012902 A1 * | 1/2019 | Kumar | H04W 4/02 |
| 2019/0197858 A1 * | 6/2019 | Moses | G05B 15/02 |

OTHER PUBLICATIONS

Office Action for U.S. Appl. No. 16/151,767, dated Sep. 5, 2019, Palmer, "Implementing Deterrent Protocols in Response To Detected Security Events", 12 pages.

* cited by examiner

IMPLEMENTING DETERRENT PROTOCOLS IN RESPONSE TO DETECTED SECURITY EVENTS

RELATED APPLICATIONS

This application claims priority to and is a continuation of U.S. patent application Ser. No. 16/151,767, filed on Oct. 4, 2018, the entire contents of which are incorporated herein by reference.

TECHNICAL FIELD

The present embodiments relate to audio/video (A/V) recording and communication devices, including A/V recording and communication doorbells, security cameras, and floodlight controllers. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have lighting systems installed at their homes, such as floodlights, spotlights, and the like. Such persons may also wish to incorporate the lighting systems into security systems, which often include one or more speakers, in order to prevent or otherwise deter suspicious and criminal activity at the property. For example, the presence of one or more lighting devices, in addition to one or more A/V recording and communication devices, such as security cameras, on the exterior of a home act as a powerful deterrent against would-be burglars.

SUMMARY

The various embodiments described herein are directed to implementing deterrent protocols in response to detected security events, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that intruders and others are often deterred from a property when the property is illuminated with lights. For example, a homeowner may install a motion sensor light outside the homeowner's property that is activated when motion is detected. This may scare off intruders who enter or come close to the property. However, such lights merely turn on and off with motion and thus, may not be as effective as desired to actually deter intruders and protect the homeowner's property, occupants of the property, and the surrounding area.

The present embodiments solve these problems by, for example, defining and implementing various deterrent protocols for lights located at the property. For example, in response to a detected security event, e.g., detected motion on or near the property, a first action defined by a deterrent protocol may be instigated by a security system. The first action may be, for example, activating one or more light emitters. The one or more light emitters may be activated in a steady state mode, e.g., a continuous on mode, such that the one or more light emitters emit light in a continuous and/or steady manner. Alternatively, the first action may activate the one or more light emitters in a non-steady state, such that the one or more light emitters emit light in a flashing pattern. If, after a predetermined amount of time, e.g., a range of five to fifteen seconds, the security event is still detected, e.g., motion is still detected, this may indicate that the potential intruder is still on the premises. Thus, based upon the deterrent protocol, a second action may be instigated. The second action may include changing the mode of the light emitted by the one or more light emitters, e.g., the activation of the light may be altered from a flashing mode to a steady state mode. Alternatively, the second action may include changing the activation of the light from a steady state mode to a flashing mode. In embodiments, the first or second action may include activating a speaker to emit audio. The audio may be in the form of, for example, a siren, music, speech, etc.

Thus, in embodiments, the deterrent protocols may define a mix of actions that may include using both one or more light emitters and one or more speakers. For example, a first action defined by a deterrent protocol may include activating one or more light emitters, either in a flashing mode or in a steady state mode. In response to continued detection of the security event, the second action defined by the deterrent protocol may include activating a speaker to emit audio. In addition, the second action may also include changing the pattern of light emitted by the one or more activated light emitters. For example, if the light was activated in a flashing mode, then the flashing pattern may be changed. Also, the lighting pattern may be changed from a flashing mode to a steady state mode, or vice versa. Third and fourth actions may be implemented in response to the continued detection of the security event, e.g., the continued detection of motion. If, after all actions defined by the deterrent protocol have been performed, if the security event continues to be detected, then emergency service responders may be contacted.

Therefore, it should be readily apparent that use of the various embodiments described herein may be beneficial in deterring and/or scaring off intruders. Such a deterrent may be extremely beneficial in preventing potential crimes, damage, unnecessary use of emergency service responders, etc. For example, arrival of emergency service responders once the intruders have left, and if no crime has been committed, may result in a fee being owed by the user to the emergency service responders. Accordingly, crime may be reduced in neighborhoods and safety in homes may be increased.

In a first aspect, a network device comprises a network interface; one or more processors; and memory communicatively coupled to the one or more processors and storing executable instructions that, when executed by the one or more processors, cause the one or more processors to perform operations comprising receiving, using the network interface, a protocol defining multiple actions; receiving, using the network interface and from a first device of a security system, first data indicating a presence of an entity at a property; based at least in part on the first data, determining a first action of the multiple actions, the first action comprising at least one of activating a light emitter to a first lighting state; or activating a speaker to a first speaker state; based at least in part on the first action, transmitting, using the network interface, at least one first signal to the at least one of the light emitter or the speaker to cause activation of the at least one of the light emitter to the first lighting state or the speaker to the first speaker state; receiving, using the network interface and from at least one of the first device of the security system or a second device of the security system, second data indicating the entity at the property; based at least in part on the second data, determining a second action of the multiple actions, the second action comprising at least one of activating the light emitter to one of the first lighting state or a second lighting state; or activating the speaker to the first speaker state or a second speaker state; based at least in part on the second action, transmitting, using the network interface, at least one second signal to the at least one of the light emitter or the speaker to cause activation of the at least one of the light emitter to the first lighting state or the second lighting state or the speaker to the first speaker state or the second speaker state.

In an embodiment of the first aspect, the first action comprises activating the speaker to the first speaker state, the first speaker state comprising the speaker outputting first audio; and the second action comprises activating the speaker to the second speaker state, the second speaker state comprising the speaker outputting second audio, the second audio corresponding to an alarm of the security system.

In another embodiment of the first aspect, the memory stores further executable instructions that, when executed by the one or more processors, cause the one or more processors to perform operations comprising selecting first audio data that represents the first audio, wherein the first signal indicates the first audio; and selecting second audio data representing the second audio, wherein the second signal indicates the second audio.

In another embodiment of the first aspect, the first action comprises activating the light emitter to the first lighting state, the first lighting state comprising the light emitter emitting first light using a steady state; and the second action comprises activating the light emitter to the second lighting state, the second lighting state comprising the light emitter emitting second light using a pattern.

In another embodiment of the first aspect, the first action comprises activating the light emitter to the first lighting state, the first lighting state comprising the light emitter emitting first light using a first pattern; and the second action comprises activating the light emitter to the second lighting state, the second lighting state comprising the light emitter emitting second light using a second pattern.

In another embodiment of the first aspect, the first action comprises activating the speaker to the first speaker state, the first speaker state comprising the speaker outputting audio; and the second action comprises activating the light emitter to the first lighting state, the first lighting state comprising the light emitter emitting light.

In another embodiment of the first aspect, the first action comprises activating the light emitter to the first lighting state, the first lighting state comprising the light emitter emitting light; and the second action comprises activating the speaker to the first speaker state, the first speaker state comprising the speaker outputting audio.

In another embodiment of the first aspect, the first action comprises activating the speaker to the first speaker state, the first speaker state comprising the speaker outputting audio.

In another embodiment of the first aspect the memory stores further executable instructions that, when executed by the one or more processors, cause the one or more processors to perform operations comprising selecting an audio clip from a plurality of audio clips, the audio clip representing the audio.

In another embodiment of the first aspect, the second action comprises activating the speaker to the second speaker state, the second speaker state comprising the speaker outputting additional audio represented by an additional audio clip from the plurality of audio clips.

In another embodiment of the first aspect, the first action comprises activating the light emitter to the first lighting state, the first lighting state comprising the light emitter emitting light.

In another embodiment of the first aspect, the first lighting state further comprises the light emitter emitting the light in a flashing pattern.

In another embodiment of the first aspect, the second action comprises activating the light emitter to the second lighting state, the second lighting state comprising the light emitter emitting light in a different flashing pattern.

In another embodiment of the first aspect, the second action comprises activating the light emitter to the second lighting state, the second lighting state comprising the light emitter emitting light at a steady state mode.

In another embodiment of the first aspect, the second action comprises activating the speaker to the first speaker state, the first speaker state comprising the speaker producing audio.

In another embodiment of the first aspect, the first action comprises activating the speaker to the first speaker state, the first speaker state comprising the speaker producing audio; the second action comprises activating the light emitter to the first lighting state; and the memory stores further executable instructions that, when executed by the one or more processors, cause the one or more processors to perform operations comprising receiving, using the network interface and from at least one of the first device of the security system or the second device of the security system, third data indicating the entity at the property; based at least in part on the third data, determining a third action of the multiple actions, the third action comprising activating the speaker to a third speaker state, the third speaker state comprising the speaker producing audio in siren mode; and based at least in part on the third action, transmitting, using the network interface, a third signal to the speaker to cause activation of the speaker to the third speaker state. lighting state.

In another embodiment of the first aspect, at least one of the determining the first action or the determining the second action is based at least in part on a time of day.

In another embodiment of the first aspect, at least one of the first lighting state, the second lighting state, the first speaker state, or the second speaker state are defined by a user.

In another embodiment of the first aspect, at least one of the first lighting state, the second lighting state, the first speaker state, or the second speaker state are default states defined by a supplier of the security system.

In another embodiment of the first aspect, the network device comprises one of a hub device, a backend device, or a light controller.

In a second aspect, a method comprises receiving first sensor data from a first device of a security system; determining that the first sensor data is indicative of a first presence of an entity at the property; selecting a first action from multiple actions, the first action comprising activating at least one of a light emitter or a speaker; transmitting a first signal to the at least one of the light emitter or the speaker to cause the first action of the multiple actions to be performed; receiving second sensor data from at least one of the first device of the security system or a second device of the security system; determining that the second sensor data is indicative over a second presence of the entity at the property; selecting a second action from the multiple actions, the second action comprising at least one of altering an activation of the at least one of the light emitter or the speaker; or activating the other of the light emitter or the speaker; and transmitting a second signal to at least one of the light emitter or the speaker to cause the second action of the multiple actions to be performed.

In an embodiment of the second aspect, the first action comprises activating the speaker such that the speaker outputs first audio; and the second action comprises altering the activation of the speaker such that the speaker outputs second audio.

In another embodiment of the second aspect, the method further comprises selecting first audio data that represents the first audio, wherein the first signal indicates the first audio; and selecting second audio data representing the second audio, wherein the second signal indicates the second audio.

In another embodiment of the second aspect, the first action comprises activating the light emitter such that the light emitter emits first light using a steady state; and the second action comprises altering the activation of the light emitter such that the light emitter emits second light using a pattern.

In another embodiment of the second aspect, the first action comprises activating the light emitter such that the light emitter emits light using a first pattern; and the second action comprises activating the light emitter such that the light emitter emits second light using a second pattern.

In another embodiment of the second aspect, the first action comprises activating the speaker such that the speaker outputs audio; and the second action comprises activating the light emitter such that the light emitter emits light.

In another embodiment of the second aspect, the first action comprises activating the light emitter such that the light emitter emits light; and the second action comprises activating the speaker such that the speaker outputs audio.

In a third aspect, a network device comprises a network interface; one or more processors; and memory communicatively coupled to the one or more processors and storing executable instructions that, when executed by the one or more processors, cause the one or more processors to perform operations comprising determining an occurrence of a security event; based at least in part on the occurrence of the security event, transmitting, using the network interface, a first signal to a first device associated with the security system to cause activation of the first device to a first state; determining, after a period of time, the occurrence of the security event is continuing; and based at least in part on the occurrence of the security event continuing, transmitting, using the network interface, at least one of a second signal to a second device associated with the security system, the second signal to cause activation of the second device; or a third signal to the first device associated with the security system, the third signal to cause activation of the first device to a second state different than the first state.

In an embodiment of the third aspect, the first device is a speaker; the activation of the speaker in the first state comprises the speaker outputting first audio; and the activation of the speaker in the second state comprises the speaker outputting second audio, the second audio corresponding to an alarm of the security system.

In another embodiment of the third aspect, the memory stores further executable instructions that, when executed by the one or more processors, cause the one or more processors to perform operations comprising selecting first audio data that represents the first audio, wherein the first signal indicates the first audio; and selecting second audio data representing the second audio, wherein the third signal indicates the second audio.

In another embodiment of the third aspect, the first device comprises a light emitter; the activation of the light emitter to the first state comprises the light emitter emitting first light using a steady state; and the activation of the light emitter to the second state comprises the light emitter emitting second light using a pattern.

In another embodiment of the third aspect, the first device comprises a light emitter; the activation of the light emitter to the first state comprises the light emitter emitting first light using a first pattern; and the activation of the light emitter to the third state comprises the light emitter emitting second light using a second pattern.

In another embodiment of the third aspect, the first device comprises a speaker; the second device comprises a light emitter; the activation of the speaker in the first state comprises the speaker outputting first audio; and the activation of the light emitter comprises the light emitter emitting light.

In another embodiment of the third aspect, the first device comprises a light emitter; the second device comprises a speaker; the activation of the light emitter in the first state comprises the light emitter emitting light; and the activation of the speaker comprises the speaker outputting audio.

In a fourth aspect, a method comprises storing a protocol including at least a first action and a second action, the protocol associated with a security system including a light emitter and a speaker; receiving first data indicating first motion; based at least in part on the first data, transmitting a first signal to control one of the light emitter or the speaker as the first action; receiving second data indicating a second motion; and based at least in part on the second data, transmitting a second signal to control one of the light emitter or the speaker as the second action.

In a fifth aspect, an Audio/Video (A/V) recording and communication device comprises one or more processors; a network interface; a speaker; a light emitter; a camera; and memory communicatively coupled to the one or more processors and storing executable instructions that, when executed by the one or more processors, cause the one or more processors to perform operations comprising detecting, using at least one of the camera or a motion sensor, a first indication of first motion at a first time; based at least in part on the first indication of first motion at the first time, causing a first action to be performed, the first action including at least one of activation of the light emitter to a first lighting state; or activation of the speaker to a first speaker state; detecting, using at least one of the camera or the motion sensor, a second indication of second motion at a second time; determining that the second time is within a threshold amount of time from the first time; and based at least in part on the second time being within the threshold amount of time from the first time, causing a second action to be performed, the second action comprising at least one of activation of the light emitter to the first lighting state; activation of the light emitter to a second lighting state from the first lighting state; activation of the speaker to the first speaker state; or activation of the speaker to a second speaker state from the first speaker state.

In an embodiment of the fifth aspect, the causing of the first action to be performed comprises causing the activation of the speaker to the first speaker state, the first speaker state including the speaker outputting first audio; and the causing of the second action to be performed comprises causing the activation of the speaker to the second speaker state, the second speaker state including the speaker outputting second audio corresponding to an alarm.

In another embodiment of the fifth aspect, the causing of the first action to be performed comprises causing the activation of the light emitter to the first lighting state, the first lighting state including the light emitter emitting first light using a steady state; and the causing of the second action to be performed comprises causing the activation of the light emitter to the second lighting state, the second lighting state including the light emitter emitting second light using a pattern.

In another embodiment of the fifth aspect, the causing of the first action to be performed comprises causing the activation of the light emitter to the first lighting state, the first lighting state including the light emitter emitting first light using a pattern; and the causing of the second action to be performed comprises causing the activation of the light emitter to the second lighting state, the second lighting state including the light emitter emitting second light using a steady state.

In another embodiment of the fifth aspect, the causing of the first action to be performed comprises causing the activation of the light emitter to the first lighting state, the first lighting state including the light emitter emitting first light using a first pattern; and the causing of the second action to be performed comprises causing the activation of the light emitter to the second lighting state, the second lighting state including the light emitter emitting second light using a second pattern.

In another embodiment of the fifth aspect, the causing of the first action to be performed comprises causing the activation of the speaker to the first speaker state, the first speaker state including the speaker outputting audio; and the causing of the second action to be performed comprises causing the activation of the light emitter to the first lighting state, the first lighting state including the light emitter emitting light.

In another embodiment of the fifth aspect, the causing of the first action to be performed comprises causing the activation of the light emitter to the first lighting state, the first lighting state including the light emitter emitting light; and the causing of the second action to be performed comprises causing the activation of the speaker to the first speaker state, the first speaker state including the speaker outputting audio.

In another embodiment of the fifth aspect, at least one of the first lighting state, the second lighting state, the first speaker state, or the second speaker state are defined by a user.

In another embodiment of the fifth aspect, at least one of the first lighting state, the second lighting state, the first speaker state, or the second speaker state are default states defined by a supplier of the security system.

In a sixth aspect, a method comprises detecting, using at least one of a camera or a motion sensor, first motion of an object; based at least in part on the first motion, controlling at least one of a light emitter or a speaker as a first action of a protocol; detecting, using at least one of the camera or the motion sensor, second motion of the object; determining that the detecting of the second motion occurred is within a predetermined time period from the detecting the first motion; and based at least in part on the detecting of the second motion occurring within the predetermined time period from the detecting of the first motion, controlling at least one of the light emitter or the speaker as a second action of the protocol different from the first action.

In an embodiment of the sixth aspect, the controlling the at least one of the light emitter or the speaker as the first action comprises causing the speaker to output first audio; and the controlling the at least one of the light emitter or the speaker as the second action comprises causing the speaker to output second output.

In another embodiment of the sixth aspect, the controlling the at least one of the light emitter or the speaker as the first action comprises causing the light emitter to emit first light using a steady state; and the controlling the at least one of the light emitter or the speaker as the second action comprises causing the light emitter to emit second light using a pattern.

In another embodiment of the sixth aspect, the controlling the at last one of the light emitter or the speaker as the first action comprises causing the light emitter to emit first light using a pattern; and controlling the at least one of the light emitter or the speaker as the second action comprises causing the light emitter to emit second light using a steady state.

In another embodiment of the sixth aspect, the controlling the at least one of the light emitter or the speaker as the first action comprises causing the light emitter to emit first light using a first pattern; and the controlling the at least one of the light emitter or the speaker as the second action comprises causing the light emitter to emit second light using a second pattern.

In another embodiment of the sixth aspect, the controlling the at least one of the light emitter or the speaker as the first action comprises causing the speaker to output audio; and the controlling the at least one of the light emitter or the speaker as the second action comprises the light emitter to emit light.

In another embodiment of the sixth aspect, the controlling the at least one of the light emitter or the speaker as the first action comprises causing the light emitter to emit light; and the controlling the at least one of the light emitter or the speaker as the second action comprises causing the speaker to output audio.

In another embodiment of the sixth aspect, the first action comprises activating the speaker to a first speaker state to produce first audio.

In another embodiment of the sixth aspect, the second action comprises altering activation of the speaker to a second speaker state to produce second audio different from the first audio.

In another embodiment of the sixth aspect, the first action comprises activating the light emitter to a first lighting state to emit light.

In another embodiment of the sixth aspect, activating the light emitter to the first lighting state comprises activating the light emitter to the first lighting state to emit light in a first flashing pattern.

In another embodiment of the sixth aspect, the second action comprises activating the light emitter to a second lighting state to emit the light in a second flashing pattern.

In another embodiment of the sixth aspect, the second action comprises altering activating the light emitter to a second lighting state to emit the light in a steady state mode.

In a seventh aspect, a method comprises causing a graphical user interface (GUI) to be displayed on a display of a client device, the GUI for creating a protocol for a security system; receiving at least one first input indicating a first action for the protocol, the first action comprising activating a light emitter associated with the security system to a first lighting state; receiving at least one second input indicating a second action for the protocol, the second action comprising activating a speaker associated with the security system to a first speaker state; receiving at least one third input indicating a third action for the protocol, the third action comprising activating the light emitter to a second lighting state different from the first lighting state; receiving at least one fourth input indicating a fourth action for the protocol, the fourth action comprising activating the speaker to a second speaker state from the first speaker state; receiving at least one fifth input indicating an order for implementation of the first action, the second action, the third action, and the fourth action; receiving at least one sixth input indicating criteria for the implementation of the first action, the second action, the third action, and the fourth action; and receiving at least one seventh input indicating an amount of time between implementation of at least a first of the first action, the second action, the third action and the fourth action and a second of the first action, the second action, the third action, and the fourth action; and transmitting, using a network interface of the client device, the protocol to a network device of the security system.

In an eighth aspect, a method comprises receiving a first input indicating a request to create a protocol for use with a security system; based at least in part on the first input, causing a graphical user interface (GUI) to be displayed on a display, the GUI for creating the protocol; receiving a second input indicating a first action for the deterrent protocol, the first action comprising activating a first one of a light or a speaker associated with the security system; receiving a third input indicating a second action for the protocol, the second action comprising activating a second one of the light or the speaker different from the first one; receiving a fourth input to perform the first action when a first criterion is met; receiving a fifth input to perform the second action when a second criterion is met within a predetermined amount of time from the first criterion being met; and transmitting, using a network interface, the protocol to a network device.

BRIEF DESCRIPTION OF THE DRAWINGS

The various embodiments of the present implementing deterrent protocols in response to detected security events now will be discussed in detail with an emphasis on highlighting the advantageous features. These embodiments depict the novel and non-obvious implementing deterrent protocols in response to detected security events shown in the accompanying drawings, which are for illustrative purposes only. These drawings include the following figures, in which like numerals indicate like parts.

DETAILED DESCRIPTION

Figure 1:
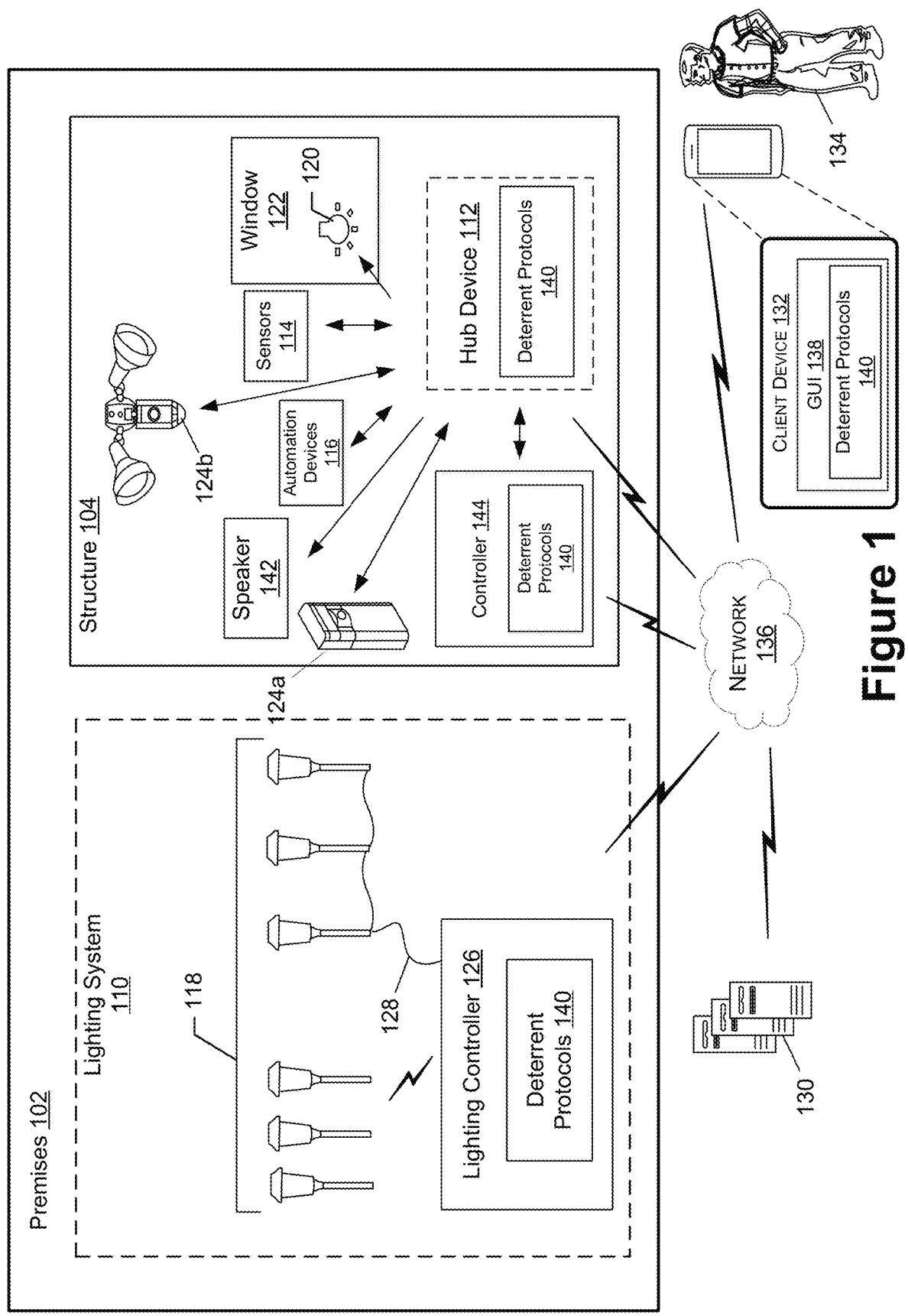
FIG. 1 is a schematic diagram of an example arrangement of a premises and a structure including a smart-home network, a security system and a lighting system, according to various aspects of the present disclosure.

The present disclosure describes, in part, a smart home network system and/or a security system that implements deterrent protocols in response to detected security events. For example, the deterrent protocols may be defined to include multiple actions that may be instigated in response to detected security events at a premises and/or a structure. A first action may include activating a light emitter or activating a speaker. If the security event continues, then a second action included in a deterrent protocol may include altering activation of the activated light emitter or the activated speaker, or may instigate activation of either the speaker or the light emitter that was not activated as part of the first.

More particularly, the premises and/or the structure included on the premises may be monitored by a security system. In embodiments, the security system may be part of or may be implemented via a smart home network. A hub device may control the smart home network and/or the security system. In embodiments, the security system may have a separate controller. Audio/video (A/V) recording and communication devices (referred to herein as "A/V devices") may include one or more of a motion sensor, a camera, a light, a speaker, etc. The A/V devices communicate with the hub device to provide information relating to potential detections indicative of the presence of a person or persons. Such potential detections may be referred to as detected security events. For example, a motion sensor on the A/V device may detect motion indicating the presence of a person or persons. Alternatively, or additionally, the camera may detect the presence of one or more persons. Additionally, the smart home network and/or security system may include other types of sensors and/or automation devices that may be utilized to detect the presence of one or more persons on or near the premises and/or structure, thereby indicating a detected security event. For example, a motion sensor that is separate from an A/V device may be used to detect the presence of one or more persons on or near the premises and/or structure.

In order to avoid immediately contacting emergency service responders, it is desirable to attempt to deter or scare away person(s) that may be unauthorized to be present on the premises and/or in the structure. For example, it is desirable to scare away or deter such person(s) prior to the person(s) committing a crime, breaking into the structure, etc. Thus, the present disclosure describes defining and implementing various deterrent protocols that utilize light emitters and/or speakers located at the property and/or the structure by activating the light emitters and/or speakers, as well as altering activation of the light emitters and/or speakers. For example, in response to a detected security event, e.g., detected motion on or near the property indicating the presence of a potential intruder, a deterrent protocol may be implemented by the hub device where the deterrent protocol includes an action calling for activation of one or more light emitters to a first lighting state by the hub device. For example, the action may be activating the one or more light emitters to the first lighting state to emit light in a steady state mode, e.g., a continuous on mode, such that the one or more light emitters emit light in a continuous and/or steady manner. Alternatively, the action may be activating the one or more light emitters to the first lighting state to emit light in a flashing pattern. If, after a predetermined amount of time, e.g., a range of five to fifteen seconds, the security event is still detected, e.g., motion is still detected, this may indicate that the potential intruder is still on the premises. Thus, based upon the deterrent protocol, a second action may be instigated by the hub device. The second action may include changing the one or more light emitters to a second lighting state such that light emitted by the one or more light emitters is changed, e.g., the activation of the one or more light emitters may be altered from a flashing mode to a steady state mode. Additionally, a second action may include changing the lighting state of the one or more light emitters such that the activation of the one or more light emitters changes from a steady state mode to a flashing mode. In embodiments, if the security event continues to be detected, e.g., motion is still detected indicating the continued presence of the potential intruder on the premises, then a third action may be implemented, depending upon the deterrent protocol, where the third action may include activating a speaker to a first speaker state. The speaker may be activated in a siren mode, may output speech, etc.

In accordance with various embodiments, deterrent protocols may be defined where the first action may be to activate the speaker as opposed to activating any light emitter. For example, depending upon an implemented deterrent protocol, the hub device may activate the speaker to a first speaker state to emit sound. In embodiments, the sound may be in the form of a predetermined audio clip. In embodiments, there may be a plurality of audio clips available from which to choose. The audio clips may be one or more of defined by the user, may be provided by the supplier of the security system and/or security components, provided by a public repository accessible by a network (e.g., the Internet), etc. The selected audio clip may be predetermined or, in embodiments, may be randomly selected, depending upon the implemented deterrent protocol. In embodiments, if the security event continues to be detected, e.g., motion continues to be detected thereby indicating that the potential intruder is still present on the premises, then the implemented deterrent protocol may instigate a second action, where the second action may alter the activated speaker, e.g., change the speaker from the first speaker state to a second speaker state. For example, the second action may include changing the audio clip used for causing the speaker to emit audio. In embodiments, the new audio clip may be predetermined or may be randomly selected. The second action may also change the audio to a siren.

In embodiments, the deterrent protocols may define a mix of actions that may include using both light emitters and one or more speakers. For example, a first action defined by a deterrent protocol may include activating one or more light emitters, either in a flashing mode or in a steady state mode. In response to continued detection of the security event, the second action defined by the deterrent protocol may include activating a speaker to emit audio. In addition, the second action may also include changing the pattern of light emitted by the activated light emitters. For example, if the light emitters were activated in a flashing mode, then the flashing pattern may be changed. Also, the lighting pattern may be changed from a flashing mode to a steady state mode, or vice versa. Third and fourth actions may be implemented in response to the continued detection of the security event, e.g., the continued detection of motion. If, after all actions defined by the implemented deterrent protocol have been performed, if the security event continues to be detected, then emergency service responders may be contacted by the hub device, as well as a user of the smart-home network and/or the security system.

In embodiments, other actions may be defined within the deterrent protocols such as, for example, changing light colors, changing the speed or frequency of the flashing pattern of the lights, changing the audio output by the speakers, e.g., changing from spoken audio to music, changing from spoken audio to a siren, changing from music to a siren, etc.

In embodiments, the deterrent protocols may be predefined by a supplier of the security system and/or security components. For example, a supplier of the hub device, a lighting controller, or a backend device associated with the smart-home network may provide one or more predefined deterrent protocols. In embodiments, the user of the smart-home network and/or security system may define one or more deterrent protocols. For example, the user may use a client device, e.g., a mobile device or other computing device, to define one or more deterrent protocols. In embodiments, a graphical user interface (GUI) may be utilized with the client device to define the deterrent protocols. The user may interact with the GUI in order to define the deterrent protocols. Thus, multiple deterrent protocols may be owned simultaneously by the user (e.g., homeowner, property owner, etc.) for selective implementation by the user, where the multiple deterrent protocols may be predefined by the supplier of the security system and/or security components and/or may be defined by the user. Deterrent protocols may be predefined or may be defined such that the deterrent protocols may be based upon a time of sunrise and/or sunset.

Although the examples described herein include a predetermined amount of time between five and fifteen seconds, in other examples, the predetermined amount of time may include a different time range. For a first example, the predetermined amount of time one to ten seconds, ten to twenty seconds, ten to thirty seconds, and/or the like. Additionally, in some examples, the predetermined amount of time may correspond to a threshold amount of time. For example, the predetermined amount of time may include five seconds, ten seconds, thirty seconds, and/or the like.

The remaining detailed description describes the present embodiments with reference to the drawings. In the drawings, reference numbers label elements of the present embodiments. These reference numbers are reproduced below in connection with the discussion of the corresponding drawing features.

FIG. 1 schematically illustrates an example arrangement of a premises 102 and a structure 104 e.g., a building such as, for example, a home, an office building, a garage-type building, etc. The premises 102 may include more than one structure 104 on the premises 102. The premises 102 and/or the structure 104 include a local network, a security system, and a lighting system 110. Although the lighting system 110 is illustrated as external to the structure 104, e.g., on the premises), the lighting system 110 may be located in the structure 104.

In some embodiments, the lighting system 110 may be included as part of the security system (e.g., as one of the one or more automation devices 114 included in the security system). Alternatively, or additionally, in other embodiments, the lighting system 110 may only be associated with the security system. As previously noted, the security system, in embodiments, may be part of the local network. In embodiments, the lighting system 110 may be part of the security system, as previously noted, and thus, may also be part of the local network system. Additionally, even if the security system and the local network are separate, the lighting system 110, in embodiments, may be part of either the security system or the local network.

In some embodiments, the security system includes sensors 114 and/or automation devices 116. For example, the security system may include door sensors 114 and window sensors 114 that respectively indicate if a door or window has been opened. If the security system is armed and a door or window sensor 114 is activated, e.g., tripped, such as in response to a sensor trigger, indicating that a corresponding door or window has been opened, then the security system may sound an alarm and/or contact a security monitoring service (not illustrated) that is communicatively coupled to the security system. The security monitoring service may contact emergency service responders if the security monitoring service determines that an emergency likely exists. In some embodiments, the security system may only sound an alarm if it is not communicatively coupled to the security monitoring service.

One or more exterior light emitters 118 may be included on the premises 102, while the structure 104 may additionally, or alternatively, include one or more interior lights 120, which may be viewable through one or more windows 122. Examples of exterior light emitters 118 include, but are not limited to, walkway lights, garden lights, pathway lights, etc. The structure 104 may also include other exterior lights (not illustrated) such as, for example, a porch light, entry lights, floodlights, etc. Such other exterior lights and/or the interior light(s) 120 may be part of the automation devices 116, e.g., may be smart devices, and may be in communication with and/or controlled by the hub device 112, as described herein.

The local network may also include one or more Audio/Video (A/V) recording and communication devices (referred to herein as A/V devices) 124, that may be located on an exterior of the structure 104 or elsewhere on the premises 102. The one or more A/V devices 124 may be in the form of, for example, a stand-alone A/V device 124a, a floodlight 124b, a doorbell, and/or a security camera. As will be described herein, the A/V devices 124 may include one or more sensors and/or a camera. Additionally, some of the sensors 114 may be stand-alone sensors located on the exterior of the structure 104 or elsewhere on the premises 102. As previously noted, the interior of the structure 104 may also include one or more sensors 114. For example, the interior of the structure 104 may include one or more of a motion detector, a camera, etc.

The hub device 112 is in communication with the A/V devices 124 and may be in communication with the sensors 114, the exterior light emitters 118, and/or the lighting system 110. The A/V devices 124 and the sensors 114 may communicate with the hub device 112 via a Wi-Fi communication conduit or may communicate with the hub device 112 via a low power wide area network (LPWAN) communication conduit. In some examples, the hub device 112 may have difficulty communicating with exterior devices via the Wi-Fi communication conduit since the hub device 112 is located within the structure 104 while many of the other devices of the local network such as, for example, the A/V devices 124 and at least some of the sensors 114, may be located external to the structure 104. Likewise, the exterior light emitters 118, and possibly the lighting system 110, are located external to the structure 104, and thereby the hub device 112.

The lighting system 110 may include a lighting controller 126 that controls at least the exterior light emitters 118. In embodiments, the hub device 112 may directly control the exterior light emitters 118, e.g., the lighting system 110 is part of the local network. The exterior light emitters 118 may include various light types. For a first example, in embodiments, the exterior light emitters 118 may include at least one low-voltage light emitter (e.g., halogen light emitters, xenon light emitters, incandescent light emitters, etc.). In such embodiments, the lighting controller 126 may include a transformer that converts power received from an external power source (not illustrated) (e.g., wall power, AC mains, etc.) from a first voltage to a second voltage less than the first voltage. The lighting controller 126 may then provide the power at the second voltage to the low-voltage light emitters (e.g., as alternating current (AC)). For a second example, in some embodiments, the exterior light emitters 118 may include at least one light emitting diode (LED) light emitter. In such embodiments, the lighting controller 126 may include a LED driver that converts AC power received from the external power source to direct current (DC). Although in some embodiments, the LED drivers may not convert the AC current to DC current and may provide AC current to the LED light emitters. The lighting controller 126 may then provide the power to the LED light emitters (e.g., as constant current or constant voltage). For a third example, in some embodiments, the exterior light emitters 118 may include at least one fluorescent light emitter. In such embodiments, the lighting controller 126 may include a ballast for supplying power to the fluorescent light emitter. Although in some embodiments, the ballast may be a component of the fluorescent light emitter itself. In either situation, the electronic device may provide the power to the fluorescent light emitters. Additionally, or alternatively, in some embodiments, to provide power to the exterior lights, the lighting controller 126 may include an internal power source (not illustrated), such as a battery, that the lighting controller 126 uses to provide the power to the exterior lights 126. In such embodiments, the internal power source may be rechargeable, such as by a solar panel or energy harvesting apparatus of the electronic device Depending on the type of exterior light emitters 118, the lighting controller 126 may communicate with the exterior light emitters 118 via the LPWAN (e.g., RingNet, LoRaWAN, etc.), Wi-Fi, Bluetooth, a hardwired conduit 128, or another communication protocol, such as those described herein. Additionally, or alternatively, depending on the type of exterior light emitters 118, the lighting controller 126 may provide power to one or more exterior lights 128 via the hardwired conduit 128. The lighting controller 126 may also, in some embodiments, communicate with the interior lights 120.

The hub device 112 may also be communicatively coupled to one or more components of a network of servers/backend devices, such as, for example, one or more backend servers 130 (referred to herein as network device 130). The network device 130 may include various processing and storage capabilities to assist the hub device 112 in managing the local network and performing data analysis. A client device 132 of a user 134 may also be communicatively coupled to the hub device 112 and the network device 130. In embodiments, one or more of the security system, the hub device 112, the lighting controller 126, the network device 130, and/or the client device 132 may be communicatively coupled to each other via a network 136. In embodiments, the hub device 112 may be communicatively coupled to the security system via Wi-Fi, the LPWAN, a hardwired communication conduit, or the like.

The security system may have various arming modes or states of operation. For example, in an armed stay mode (also referred to as a home mode or stay mode), which may indicate that there are entities (e.g., people and/or animals) present within the structure, the security system may activate one or more external and/or perimeter sensors (e.g., door sensors, window sensors, external motion sensors, etc.), or even all of the external sensors, but not arm interior sensors such as, for example internal motion detectors, internal audio sensors, etc. As another example, in an armed away mode (also referred to as an away mode), which may indicate that there are no entities present within the structure, then one or more of the internal sensors such as, for example internal motion detectors, internal audio sensors, internal temperature sensors, etc., may be armed along with one or more of the external sensors, including door sensors and window sensors. Furthermore, the security system may include and/or utilize A/V devices 124 and/or automation devices 116 for detecting a security event, e.g., a detected presence of an entity (intruder) on the premises. For example, the exterior light emitters 118 may include motion sensors, in some embodiments, where the motion sensors not only detect motion to determine whether or not to turn themselves on, but also may inform the security system of the motion they detect.

In embodiments, the user 134 may interact with a Graphical User Interface (GUI) 138 using the client device 132 to define one or more deterrent protocols 140. While FIG. 1 illustrates the client device 132 as a mobile device, other types of client devices may be used, e.g., a stationary computing device. The deterrent protocols 140 may be implemented, for example, by the security system, the hub device 112, or the lighting controller 126 in response to a detected security event, e.g., detected motion on or near the premises 102 and/or the structure 104. The detected security event may be based upon data provided by one or more of the A/V devices 124, the sensors 114, and/or the automation devices 116, as will be described further herein.

In embodiments, the deterrent protocols 140 may be stored by the hub device 112, the lighting controller 126, the network device 130, a controller 144 of the security system, and/or the A/V devices 124. In embodiments, the appropriate component, e.g., the hub device 112, the lighting controller 126, the network device 130, the controller 144, or an A/V device 124, implementing a deterrent protocol 140 may obtain the deterrent protocol 140 from another component that is storing the deterrent protocol 140. For example, the hub device 112 may obtain the deterrent protocols 140 from the network device 130, the controller 144, the lighting controller 126, an A/V device 124, and/or directly from the client device 132. For example, in some embodiments, the hub device 112 may obtain the deterrent protocols 140 from the network device 130, which may obtain the deterrent protocols 140 from the client device 132. Additionally, once deterrent protocols 140 have been obtained by the hub device 112 and/or the lighting controller 126, the deterrent protocols 140 may be stored within memory of the hub device 112 and/or the lighting controller 126 for future use. Furthermore, once deterrent protocols 140 have been obtained by the hub device 112, the controller 144, and/or the lighting controller 126, and while stored on the hub device 112, the controller 144, and/or the lighting controller 126, the client device 132 and/or the network device 130 may periodically update the deterrent protocols 140 on the hub device 112, the controller 144, and/or the lighting controller 126 so that the deterrent protocols 140 are up-to-date on the hub device 112, the controller 144, and/or the lighting controller 126. In embodiments, the hub device 112 may implement a deterrent protocol 140 that may require the hub device 112 to control the lighting controller 126. In embodiments, a deterrent protocol 140 may be implemented by the floodlight A/V device 124b to control the floodlight A/V device 124b to perform various actions with respect to the floodlight and/or a speaker included with the floodlight A/V device 124b.

As a first example, a deterrent protocol 140 may define a first action for instigation in response to a detected security event where one or more exterior light emitters 118, one or more interior lights 120, and/or the floodlight A/V device 124b may be activated to a first lighting state. The one or more exterior light emitters 118, one or more interior lights 120, and/or the floodlight A/V device 124b may be activated in response to a control signal provided by the component implementing the deterrent protocol 140, e.g., the hub device 112, the controller 144, and/or the lighting controller 126. In some examples, the first action may include activating the one or more exterior light emitters 118, one or more interior lights 120, and/or the floodlight A/V device 124b in a steady state mode, e.g., a continuous on mode, such that the one or more lights emit light in a continuous and/or steady manner. In some examples, the first action may include activating the one or more exterior light emitters 118, one or more interior lights 120, and/or the floodlight A/V device 124b in a flashing pattern. If, after a predetermined amount of time, e.g., a range of five to fifteen seconds, the security event is still detected, e.g., motion is still detected, this may indicate that the potential intruder is still on or near the premises 102. Thus, the deterrent protocol 140 may define a second action to be instigated.

The second action may include changing the mode of the one or more activated light emitters 118, the one or more interior lights 120, and/or the floodlight A/V device 124b to a second lighting state. For a first example, the activation of the lights may be altered from a flashing mode to a steady state mode. For a second example, the activation of the lights may be altered from a steady state mode to a flashing mode. The second action may be instigated in response to a control signal provided by the component implementing the deterrent protocol 140, e.g., the hub device 112, the controller 144, and/or the lighting controller 126. In embodiments, if the security event continues to be detected after a predetermined amount of time (e.g., a range of five to fifteen seconds), e.g., motion is still detected indicating the continued presence of a potential intruder on or near the premises 102, then the deterrent protocol 140 may define a third action to be instigated, where the third action may include activating one or more speakers 142 to a first speaker state to emit audio. The third action may be instigated in response to a control signal provided by the component implementing the deterrent protocol 140, e.g., the hub device 112, the controller 144, the lighting controller 126, and/or an A/V device 124 to the one or more speakers 142.

In embodiments, the one or more speakers 142 may include one or more stand-alone speakers and/or speakers that are part of A/V devices 124. The one or more speakers 142 may be activated in a siren mode, may be activated to output speech, etc. If, after a predetermined amount of time, a range of five to fifteen seconds, the security event is no longer detected, e.g., motion is no longer detected, indicating the potential intruder is no longer on or near the premises 102, then what ever action is currently being taken may be discontinued, e.g., the activated lights may be turned off and/or the activated speakers may quit emitting sound. The discontinuing of the action may be in response to a control signal provided by the component implementing the deterrent protocol 140, e.g., the hub device 112, the controller 144, the lighting controller 126, and/or an A/V device 124. Actions may also be defined to include simultaneous activation and/or alteration of activation of lights and/or speakers. For example, the second action may call for altering of a flashing pattern of one or more activated exterior light emitters 118 and/or the floodlight 124b, while simultaneously activating one or more of the speakers 142.

As another example, a deterrent protocol 140 may be defined where the first action may be to activate the one or more speakers 142 to a first speaker state as opposed to activating one or more external light emitters 118, one or more interior lights 120, and/or the floodlight A/V device 124b. For example, depending upon the deterrent protocol 140, the one or more speakers 142 may be activated to emit sound. The first action may be instigated in response to a control signal provided by the component implementing the deterrent protocol 140, e.g., the hub device 112, the controller 144, the lighting controller 126, and/or an A/V device 124. In embodiments, the sound may be in the form of a predetermined audio clip that may be stored in one or more of the hub device 112, a controller 144 of the security system, the lighting controller 126, and/or an A/V device 124. In embodiments, there may be a plurality of audio clips available from which to choose. The audio clips may be one or more of defined by the user 134, may be provided by the supplier of the security system, the lighting system 110, the lighting controller 126, and/or the A/V devices 124, provided by a public repository, etc. The selected audio clip may be predetermined or, in embodiments, may be randomly selected from the plurality of audio clips. In embodiments, if, after a predetermined amount of time, e.g., a range of five to fifteen seconds, the security event continues to be detected, e.g., motion continues to be detected thereby indicating that the potential intruder is still present on or near the premises 102, then the deterrent protocol 140 may define a second action, where the second action may alter the activated speaker(s) 142 to a second speaker state.

For example, the second action may include changing the audio clip used for causing the speaker to emit audio. In embodiments, the new audio clip may be predetermined or may be randomly selected from the plurality of audio clips. The second action may be instigated in response to a control signal provided by the component implementing the deterrent protocol 140, e.g., the hub device 112, the controller 144, the lighting controller 126, and/or an A/V device 124. In embodiments, if the security event continues to be detected, e.g., motion is still detected indicating the continued presence of a potential intruder on or near the premises 102, then the deterrent protocol 140 may define further actions to be instigated. For example, a third action may include activating one or more exterior light emitters 118 and/or the floodlight A/V device 124b, as previously described. The third action may be instigated in response to a control signal provided by the component implementing the deterrent protocol 140, e.g., the hub device 112, the controller 144, the lighting controller 126, and/or an A/V device 124. If, after a predetermined amount of time, e.g., a range of five to fifteen seconds, the security event is no longer detected, e.g., motion is no longer detected, indicating the potential intruder is no longer on or near the premises 102, then what ever action is currently being taken may be discontinued, e.g., the activated lights may be turned off and/or the activated speakers may quit emitting sound. The discontinuing of the action may be in response to a control signal provided by the component implementing the deterrent protocol 140, e.g., the hub device 112, the controller 144, and/or the lighting controller 126. As previously noted, actions may also be defined to include simultaneous activation and/or alteration of activation of lights and/or speakers. For example, the second action may call for altering of a flashing pattern of one or more activated exterior light emitters 118 and/or the floodlight 124b, while simultaneously activating one or more of the speakers 142.

Thus, in embodiments, the deterrent protocols 140 may define a mix of actions that may include using both exterior light emitters 118, interior lights 120, floodlight A/V device 124b, and/or one or more speakers 142. For example, a first action defined by a deterrent protocol may include activating one or more exterior light emitters 118, one or more interior lights 120, and/or the floodlight A/V device 124b, either in a flashing mode or in a steady state mode. In response to continued detection of the security event, a second action defined by the deterrent protocol may include activating one or more speakers 142 to emit audio. In addition, the second action may also include changing the pattern of light emitted by the activated one or more lights. For example, if the one or more lights were activated in a flashing mode, then the flashing pattern may be changed. Also, the lighting pattern may be changed from a flashing mode to a steady state mode, or vice versa. Third and fourth actions may be instigated in response to the continued detection of the security event, e.g., the continued detection of motion. If, after all actions defined by the deterrent protocol have been performed, if the security event continues to be detected, then emergency service responders may be contacted. The contacting of the emergency service responders may be instigated in response to one of the electronic devices, e.g., the hub device 112, the controller 144, the lighting controller 126, and/or an A/V device 124, transmitting a message to the network device 130 to contact the emergency service responders. If, after a predetermined amount of time, e.g., a range of five to fifteen seconds, the security event is no longer detected, e.g., motion is no longer detected, indicating the potential intruder is no longer on or near the premises 102, then what ever action is currently being taken may be discontinued, e.g., the activated lights may be turned off and/or the activated speakers may quit emitting sound. Actions may be defined to include simultaneous activation and/or alteration of activation of lights and/or speakers. For example, the second action may call for altering of a flashing pattern of one or more activated exterior light emitters 118 and/or the floodlight 124b, while simultaneously activating one or more of the speakers 142.

In embodiments, one or more deterrent protocols 140 may be predefined by a supplier of the hub device 112, the lighting system 110, the lighting controller 126, and/or the A/V devices 124. For example, such a supplier may provide one or more predefined deterrent protocols 140 that may be implemented by the user 134. In embodiments, the user 134 may define one or more additional deterrent protocols 140. For example, the user 134 may use the client device 132 to interact with the GUI 138 to define one or more additional deterrent protocols 140. Multiple deterrent patterns 140 may be owned simultaneously by the user 134 for selective implementation, where the multiple deterrent patterns 140 may be predefined by the supplier of the hub device 112, the lighting system 110, the lighting controller 126, and/or the A/V devices 124 and/or may be defined by the user 134. Deterrent protocols 140 may be predefined or may be defined such that the deterrent protocols 140 may be based upon a time of sunrise and/or sunset.

In embodiments, actions may be defined within the deterrent protocols 140 such as, for example, changing light colors, changing the speed or frequency of the flashing pattern of the lights, changing a flashing pattern of the lights, changing the audio output by the speakers, e.g., changing from spoken audio to music, changing from spoken audio to a siren, changing from music to a siren, etc. Additionally, actions defined with the deterrent protocols 140 may include increasing activation of one or more exterior light emitters 118, the floodlight A/V device 124*b*, and/or one or more interior lights 120. For example, if a first action of a deterrent protocol 140 activates a first exterior light emitter 118, then a second action of the deterrent protocol may be to activate a second exterior light emitter 118, the floodlight A/V device 124*b*, and/or one or more interior lights 120. Also, if a light is already on, then the deterrent protocols 140 may instigate actions to change the mode of the light, activate additional lights, activate one or more speakers 142, etc. In embodiments, a deterrent protocol 140 may be implemented directly by the floodlight A/V device 124*b* to control the floodlight A/V device 124*b* to perform various actions with respect to the floodlight and/or a speaker included with the floodlight A/V device 124*b*.

Additionally, a deterrent protocol 140 may include actions where one or more exterior light emitters 118 may flash in a different color than a default color, e.g., white. Flashing of the one or more exterior light emitters 118 may alert others that a problem or potential crime is occurring on the premises 102, e.g., an intruder has been detected, a break-in is occurring on the premises 102, and/or the user 134 is in distress, etc. Additionally, in embodiments, a deterrent protocol 140 may include actions where one or more exterior light emitters 118 may flash in a specific pattern, e.g., "S-O-S," to alert others that an intruder is present, a crime is occurring, and/or the user 134 is in distress. For example, the "S-O-S" pattern may be based upon Morse code and thus, may be represented by the internationally recognized lighting pattern consisting of three short flashes of light, three long flashes of light, and three more short flashes of light.

One or more deterrent protocols 140 may also be defined based upon an intensity of a detected security event, e.g., motion sensitivity. For example, for a slight detection of motion by a motion sensor 114 (e.g., might just be a small animal), only a single exterior light emitter 118 may be activated as an action of a deterrent protocol and the intensity of the activated exterior light emitter 118 may be less than for a greater detection of motion. For a greater detection of motion by the motion sensor 114 (e.g., might be a person(s) or a large animal(s)), one or more exterior light emitters 118, the floodlight A/V device 124*b*, and/or one or more interior lights 120 may be activated as an action of a deterrent protocol 140 and the intensity (e.g., degree of intensity) of the activated one or more exterior light emitters 118, the floodlight A/V device 124*b*, and/or one or more interior lights 120 may be greater than for a slight detection of motion.

In embodiments, one or more deterrent protocols 140 may be defined based upon an arming mode of a security system. For example, a deterrent protocol 140 may be defined for use when the security system is set in a stay mode. As previously noted, when the security system is in the stay mode, then this may be an indication of entities present within the structure 104. Thus, such a deterrent protocol 140 may activate only one or more exterior light emitters 118, the floodlight A/V device 124*b*, and/or one or more speakers 142, as a first action.

In embodiments, one or more deterrent protocols 140 may be defined for when the security system is set in an away mode. As previously noted, in away mode, there may be no entities present within the structure 104. Thus, one or more internal sensors 114 may be activated in the away mode along with external sensors 114. For example, in addition to sensors 114 that indicate that a door or a window has been opened, internal motion detectors, cameras, etc., may be activated. Additionally, external motion detectors, cameras, etc., including sensors within A/V devices 124, may also be activated. Thus, such deterrent protocols 140, in embodiments, may include actions that cause one or more interior lights 120, e.g., a single interior light 120 or a set of interior lights 120, to activate. The one or more interior lights 120 may be lights that are not already activated, e.g., dining room lights, bedroom lights, bathroom lights, closet lights, etc., since often one or more interior lights may already be activated when nobody is home. Additionally, the one or more interior lights 120 may be activated at a first intensity and/or may be increased from a first intensity to a second intensity if the one or more interior lights 120 were already activated when the deterrent protocol 140 is implemented by, for example, the hub device 112. Likewise, in embodiments, actions may be defined with the deterrent protocol that activate one or more exterior light emitters 118 and/or the floodlight A/V device 124*b*, either in addition to one or more interior lights 120 or instead of the one or more interior lights 120.

In embodiments, one or more deterrent protocols may be defined for when the security system 1602 is not activated, e.g., is disarmed and is not armed in either the stay mode or the away mode. For example, a deterrent protocol 140 may be defined for situations where the local network has activated one or more of the A/V devices 124. Thus, sensors 114 associated with the structure 104 may not be activated, but one or more A/V devices 124 may be activated. For example, an A/V device 124 may be included with a doorbell of the structure 104. Upon activation of the doorbell, such a deterrent protocol 140 may include an action to turn on one or more lights, for example, the floodlight A/V device 124*b*, a porch light, etc. Also, an action may be defined within the deterrent protocol 140 to activate an interior light 120, for example, within an interior entryway of the structure 104. Either action may be a first or second action, or may be included as a single action.

While the previous examples have been described with respect to the hub device 112, the controller 144, and/or the lighting controller 126 controlling the lighting system 110, in embodiments, all processing of data and control of the lighting system 110 may be handled by the network device 130, either directly with respect to the lighting system 110 or via the hub device 112. For example, upon detection of the security event by a sensor 114 and/or an A/V device 124, the hub device 112 may inform the network device 130 of the security event which may cause the network device 130 to initiate the appropriate deterrent protocol 140. Informing the network device 130 may include transmitting, over the network 136, data that indicates that the security event is occurring. In embodiments, the processing of data and control of the lighting system 110 may be handled by both the hub device 112 and the network device 130, e.g., the hub device 112 and the network device 130 may split responsibilities. Likewise, in embodiments, processing of data and control of the lighting system 110 may be handled entirely by the hub device 112 or the network device 130. In embodiments, control of the lighting system 110 may be handled by the controller 144 of the security system.

In embodiments, upon implementation of a deterrent protocol 140, an alert or notification may be provided to the client device 132, by the hub device 112, the controller 144, or the network device 130. Additionally, if other sensors 114 are activated, even after initiation of a deterrent protocol 140, then the hub device 112, the controller 144, or the network device 130 may notify emergency service responders of a need for emergency services. Such activation may indicate, for example, that an intruder has entered the structure 104.

Determination of whether a security event is still occurring or has ended may be done using a variety of methods. For example, one or more of the A/V devices 124 may be recording image data, and the image data may be analyzed, such as using computer vision processing and/or image processing, to determine if an intruder or other unwanted entity is still present and/or if an emergency situation exists (e.g., resident is in distress, having a heart attack, etc.). In addition, one or more devices may include a microphone, and the audio data generated by the microphone(s) may be analyzed using sound processing to determine if one or more unwanted entities are still present and/or if an emergency situation exists. In addition, in some embodiments, sensor data from one or more of the sensors 114 and/or the automation devices 116 may be analyzed to determine if motion is still detected (e.g., using motion sensors), if doors and/or windows are still breached, or new doors and windows are breached (e.g., using contact sensors), and/or to determine if smoke alarms, CO detectors, freeze sensors, and/or other sensors still detect an emergency situation (e.g., a fire, a flood, a freeze, etc.).

In embodiments, the sensor 114 that originally detected the security event, e.g., the camera, motion detector, or other sensor, may no longer detect the presence of an object and thus may indicate, since no other sensors 114 have been triggered, the end of the security event. For example, if a camera is no longer generating image data representing an image of a potential intruder, and no other sensors 114 have been triggered indicating that the intruder has entered the structure 104, then the hub device 112 may provide an analysis that the security event has ended and that there is no longer a threat on the premises 102. The hub device 112 may then send a control signal to activated lights and/or activated speakers to cease implementation of any deterrent protocols. In embodiments, the hub device 112 may send a control signal to instruct the lighting controller 126 of the lighting system 110 to cease implementing any deterrent protocols 140. Thus, use of the deterrent protocols 140 may be prior to contacting emergency service providers. For example, if is determined that the security event has ended prior to actual entry into the structure 104, e.g., the intruder has been scared off, then the deterrent protocol 140 in use may be ended and emergency service providers may not be contacted. In embodiments, contact of the emergency service providers may occur simultaneously in conjunction with implementation of a deterrent protocol 140, either automatically or at the request of a user 134, e.g., via the client device 132.

In embodiments, after security events having a long duration and/or excessive change of pixilation of lights of the lighting system 110, a brief survey may be provided to the user 134, neighbors of the premises 102 and/or other users with respect to effectiveness of deterrent protocols 140. For example, a three-question survey (fewer questions or more questions may be included in the survey) may be provided, where all three questions may be provided at once so that as little time as possible may be taken from the user and/or neighbors and/or other users. Based at least in part on the surveys, deterrent protocols 140 may be rated as to effectiveness. The deterrent protocols 140 may be sorted by effectiveness ratings (e.g., based upon average rating), weighted by count (e.g., number of times rated), number of times a deterrent protocol 140 is implemented and/or activated (active state), weighted by duration of activation (active state), negatively weighted based upon count of dis-implementations, etc. Results may be pushed to a public repository, where new uploads of results may be cross-referenced to prevent duplicate records with respect to deterrent protocols 140. Deterrent protocols 140 may be sorted based upon the effectiveness ratings in either a descending or ascending order depending on the ratings. Also, in embodiments only a certain percentile of results of effectiveness with respect to deterrent protocols 140 may be provided to the user 134, neighbors and/or other users, e.g., a top 50 percentile.

In embodiments, if a deterrent protocol 140 progresses to where all lights and/or speakers are activated, e.g., an "emergency mode," all video cameras may be activated and all subsequently obtained video may be saved. The saved video may be provided to neighbors of the premises 102 and/or other users, either directly or via a public repository.

Figure 2:
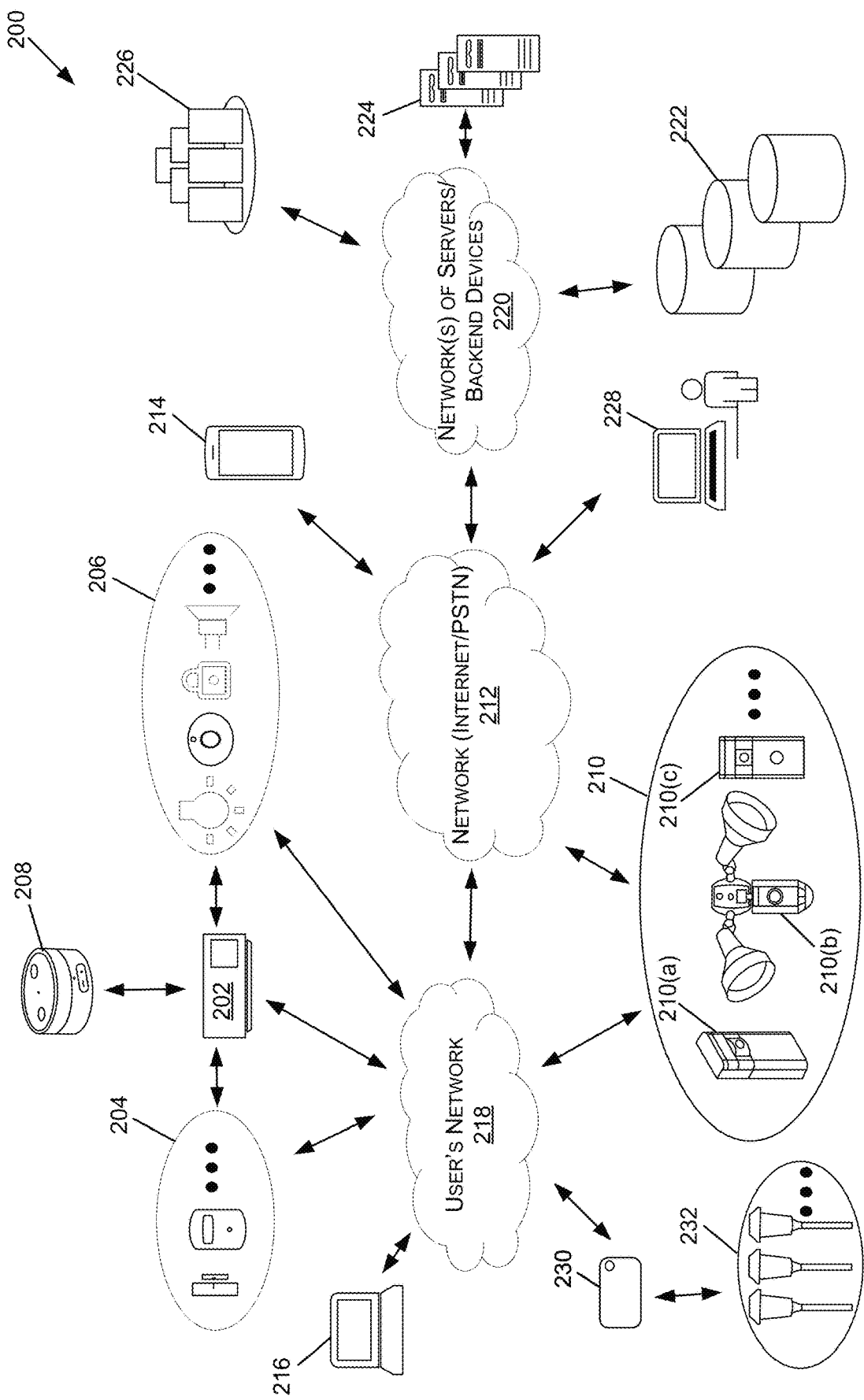
FIG. 2 is a functional block diagram illustrating a system for communicating in a network according to various aspects of the present disclosure.

FIG. 2 is a functional block diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, Audio/Video (A/V) devices 210, lighting controller 230, light emitters 232, etc.), when remotely monitored and controlled via a network (Internet/a public switched telephone network (PSTN)) 212 (which may be similar to, and represent the network 136), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V devices 210, the lighting controller 230, the light emitters 232, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (which may alternatively be referred to herein as "A/V devices 210" or "A/V device 210") (which may be similar to, and/or represent, the A/V devices 124). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or video data. The A/V devices 210 may be configured to access a user's network 218 to connect to a network (Internet/PSTN) 212 and/or may be configured to access a cellular network to connect to the network (Internet/PSTN) 212. The A/V devices 124 of FIG. 1 may include similar components and functionality as the A/V devices 210. The components and functionality of the A/V devices 210 (and the A/V devices 124) are described in more detail below with respect to FIGS. 3 and 4.

The system 200 may further include a smart-home hub device 202 (which may alternatively be referred to herein as the "hub device 202") (which may be similar to, and/or represent, the hub device 112) connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, the lighting controller 230, the light emitters 232, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, the lighting controller 230, the light emitters 232, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. The components and functionality of the smart-home hub device 202 are described in more detail below with respect to FIG. 7. In some of the present embodiments, the A/V devices 210, the VA device 208, the sensors 204, the lighting controller 230, the light emitters 232, and/or the automation devices 206 may, in addition to or in lieu of communicating with the smart-home hub device 202, communicate with the client devices 214, 216, the VA device 208, and/or one or more of a components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, the lighting controller 230, the light emitters 232, and/or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 (which may be similar to, and/or represent, the sensors 114) may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) a security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system. A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices. In some examples, the lighting controller 230 and/or the light emitters 232 may be considered automation devices and/or may be considered part of an automation device or system (e.g., an outdoor lighting system, an indoor lighting system, and indoor/outdoor lighting system, etc.). The lighting controller 126, one or more exterior light emitters 118, and/or one or more interior lights 120 of FIG. 1 may include similar components and functionality as the lighting controller 230 and light emitters 232, respectively.

As described herein, in some of the present embodiments, some or all of the client devices 214, 216, the A/V device(s) 210, the smart-home hub device 202, the VA device 208, the sensors 204, the automation devices 206, the lighting controller 230, and/or the light emitters 232 may be referred to as a security system and/or a home-automation system (e.g., local network). The security system and/or home-automation system may be installed at location, such as a property, home, business, or premises for the purpose of securing and/or automating all or a portion of the location.

The system 200 may further include one or more client devices 214, 216 (which may be similar to, and/or represent, the client device 132). The client devices 214, 216 may communicate with and/or be associated with (e.g., capable of access to and control of) the A/V devices 210, a smart-home hub device 202, the VA device 208, sensors 204, automation devices 206, the lighting controller 230, and/or the light emitters 232. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, the lighting controller 230, the light emitters 232, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224 (referred to herein as backend device 224), and one or more backend application programming interfaces (APIs) 226. While FIG. 2 illustrates the storage device 222, the backend device 224, and the backend API 226 as components separate from the network 220, it is to be understood that the storage device 222, the backend device 224, and/or the backend API 226 may be considered to be components of the network 220. For example, the network 220 may include a data center with a plurality of computing resources used to implement the storage device 222, the backend device 224, and the backend API 226.

The hub device 202, the sensors 204, the automation devices 206, the A/V devices 210, the lighting controller 230, the light emitters 232, and/or the client devices 214, 216 may be controlled in a variety of manners, such as through touch input (e.g., on a touch screen or touch pad), button input (e.g., on a hardware button), keyboard input, mouse input, voice input (e.g., using speech recognition, Natural Language Processing (NLP), etc.), gesture input (e.g., using cameras to capture body motion of a user's hands, face, or other body parts), etc. In some embodiments, input received through one device may be used to control another device. In one example, voice input that is received through the hub device 202 (or one or more of the A/V devices 210) may be processed to control other devices of the system, such as some or all of the user's network 218, the client devices 214, 216, the A/V devices 210, the sensors 204, and/or the automation devices 206. In another example, touch input received through the client devices 214, 216 on a touch screen may control other devices of the system 200. In yet other examples, any device of the system 200 may receive input from a user, input instrument, or other device/entity to control another device of the system 200.

The backend device 224 (which may represent, and/or include, the network device 130) may comprise a computer program or other computer executable code that, when executed by a processor of the backend device 224, causes the backend device 224 to wait for requests from other computer systems or software (clients) and provide responses. In an embodiment, the backend device 224 shares data and/or hardware and/or software resources among the client devices 214, 216. This architecture is called the client-server model. The client devices 214, 216 may run on the same computer or may connect to the backend device 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend device 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220 (and/or the user's network 218) (and/or the network (Internet PSTCN) 212) may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 830.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, the lighting controller 230, the A/V devices 210, any of the components of the network(s) of servers/backend devices 220 (e.g., the backend device 224, the backend API 226, the storage devices 222, etc.), and/or any other electronic device may be referred to herein as a "network device" or "network devices".

With further reference to FIG. 2, the system 200 may also include a security monitoring service 228. The security monitoring service 228 may be operated by the same company that manufactures, sells, and/or distributes the A/V devices 210, the hub device 202, the VA device 208, the lighting controller 230, the light emitters 232, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the lighting controller 230, the light emitters 232, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the lighting controller 230, the light emitters 232, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

The system 200 may also include the lighting controller 230 (which may represent, and/or be similar to, the lighting controller 126). The lighting controller 230 may be configured to control the light emitters 232 (which may represent, and/or be similar to, the light emitters 118) using protocols. As described herein, a light emitter 232 may include any device that includes a light emitter that is capable of emitting light. For example, a light emitter may include, but is not limited to, a light bulb, a lamp, a laser, a light emitting diode (LED), and/or any other source that is capable of emitting light. The light emitters 232 may include pathway lights, walkway lights, floodlights, spotlights, security lights, dome lights, entryway lights, garden lights, outdoor lights, indoor lights, landscape lighting, accent lighting, wall sconces, bullets, globes, and/or any other type of light emitter.

The light emitters 232 may include at least a first type of light emitter 232, a second type of light emitter 232, and a third type of light emitter 232. The first type of light emitters 232 may be configured to receive power from the lighting controller 230. To control the first type of light emitters 232, the lighting controller 230 may begin to provide power to the first type of light emitters 232 to activate the first type of light emitters 232 and cease providing the power the deactivate the first type of light emitters 232. Additionally, the second type of light emitters 232 may be configured to receive power from the lighting controller 230. To control the second type of light emitters 232, the lighting controller 230 (and/or other electronic devices, such as the A/V devices 210) may transmit first control signals to the second type of light emitters 232 that are configured to cause the second type of light emitters 232 to activate, and transmit second control signals to the second type of light emitters 232 that are configured to cause the second type of light emitters 232 to deactivate. Furthermore, the third type of light emitters 232 may be configured to receive power from a source that is external to the lighting controller 230, such as a battery. To control the third type of light emitters 232, the lighting controller 230 (and/or other electronic devices, such as the A/V devices 210) may transmit first control signals to the third type of light emitters 232 that are configured to cause the third type of light emitters 232 to activate, and transmit second control signals to the third type of light emitter 232 that are configured to cause the third type of light emitters 232 to deactivate.

As described herein, activating a light emitter 232 may include changing a state of the light emitter from an off state to an on state. For example, activating the light emitter 232 may include providing power to the light emitter in order to cause the light emitter to emit light. Furthermore, deactivating a light emitter 232 may include changing a state of the light emitter 232 from an on state to an off state. For example, deactivating the light emitter may include ceasing from providing power to the light emitter in order to cause the light emitter to stop emitting light. In some examples, the lighting controller 230 (and/or another device, such as the hub device, 202, the backend server 224, etc.) may change a state of the light emitters 232. For a first example, the lighting controller 230 may cause the light emitter 232 to operate in a first state where the light emitter 232 is powered on to emit light at a first intensity, first color, first brightness, first pattern (e.g., constant light, flickering, pulsating, chirping, etc.), and/or the like. For a second example, the lighting controller 230 may cause the light emitter 232 to operate in a second state where the light emitter 232 is powered on to emit light at a second intensity, second color, second brightness, and/or the like.

Figure 3:
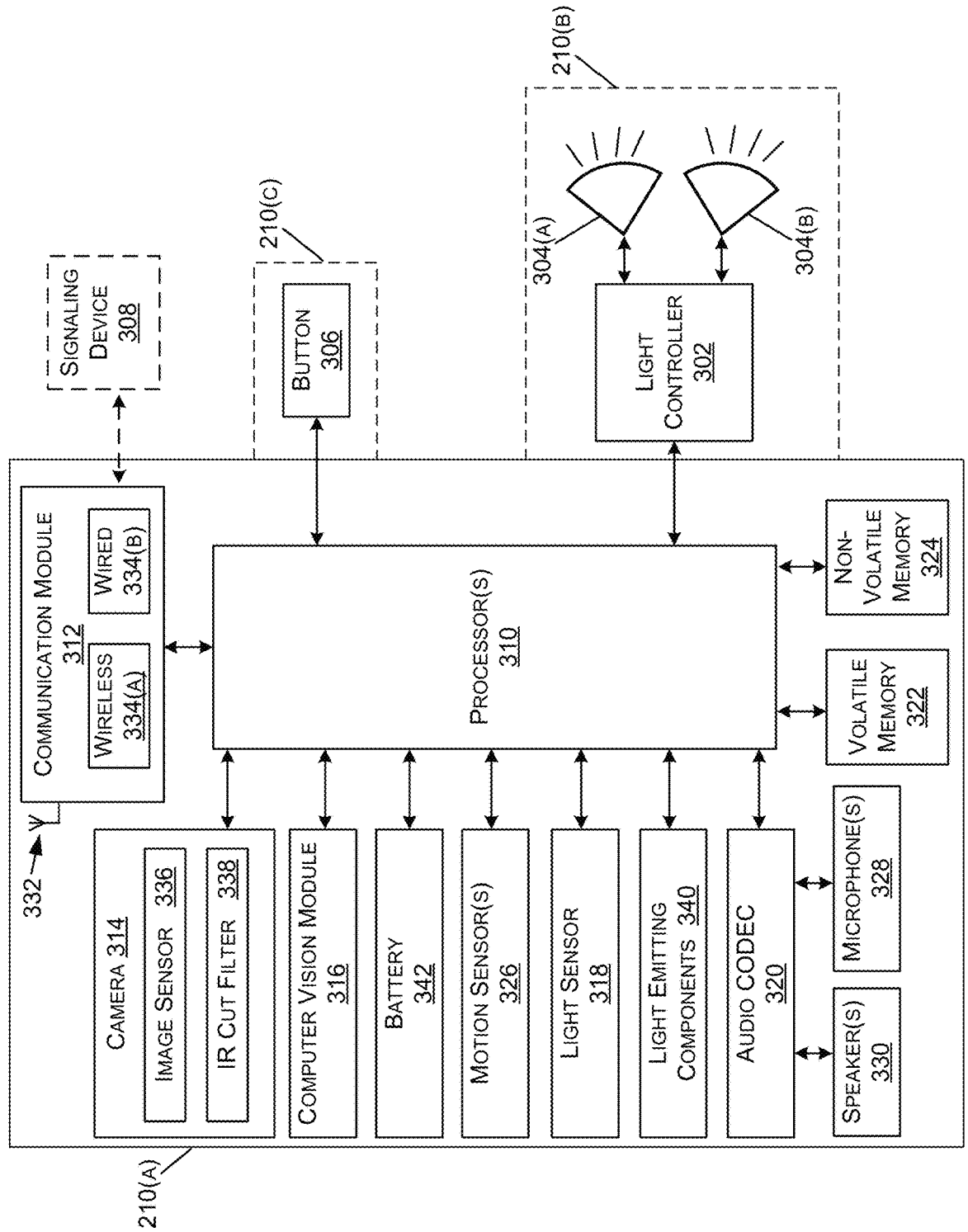
FIG. 3 is a functional block diagram of an A/V device according to various aspects of the present disclosure.

FIG. 3 is a functional block diagram for an audio/video (A/V) device according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or the another wireless communication protocol). Additionally, in some embodiments, the A/V device 210 may omit one or more of the components shown in FIG. 3. Furthermore, in some embodiments, the A/V device 210 may include one or more additional components not shown in FIG. 3.

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various embodiments, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some embodiments, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in embodiments where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(c) is pressed, the network interface 312 may be triggered to perform one or more functions, such as to transmit a signal over the wired 334(b) connection to the signaling device 308 (although, in some embodiments, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1080p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend device 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device

210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in their field of view and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to, re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message or notification), using the network interface 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, the A/V device 210 may not include the speakers 330, microphones 328, and/or audio CODEC. In such examples, the A/V device 210 may only have video recording and communication functionalities. In other examples, the A/V device 210 may only have the speaker 330 and not the microphones 328, or may only have the microphones 328 and not the speakers 330.

Figure 4:
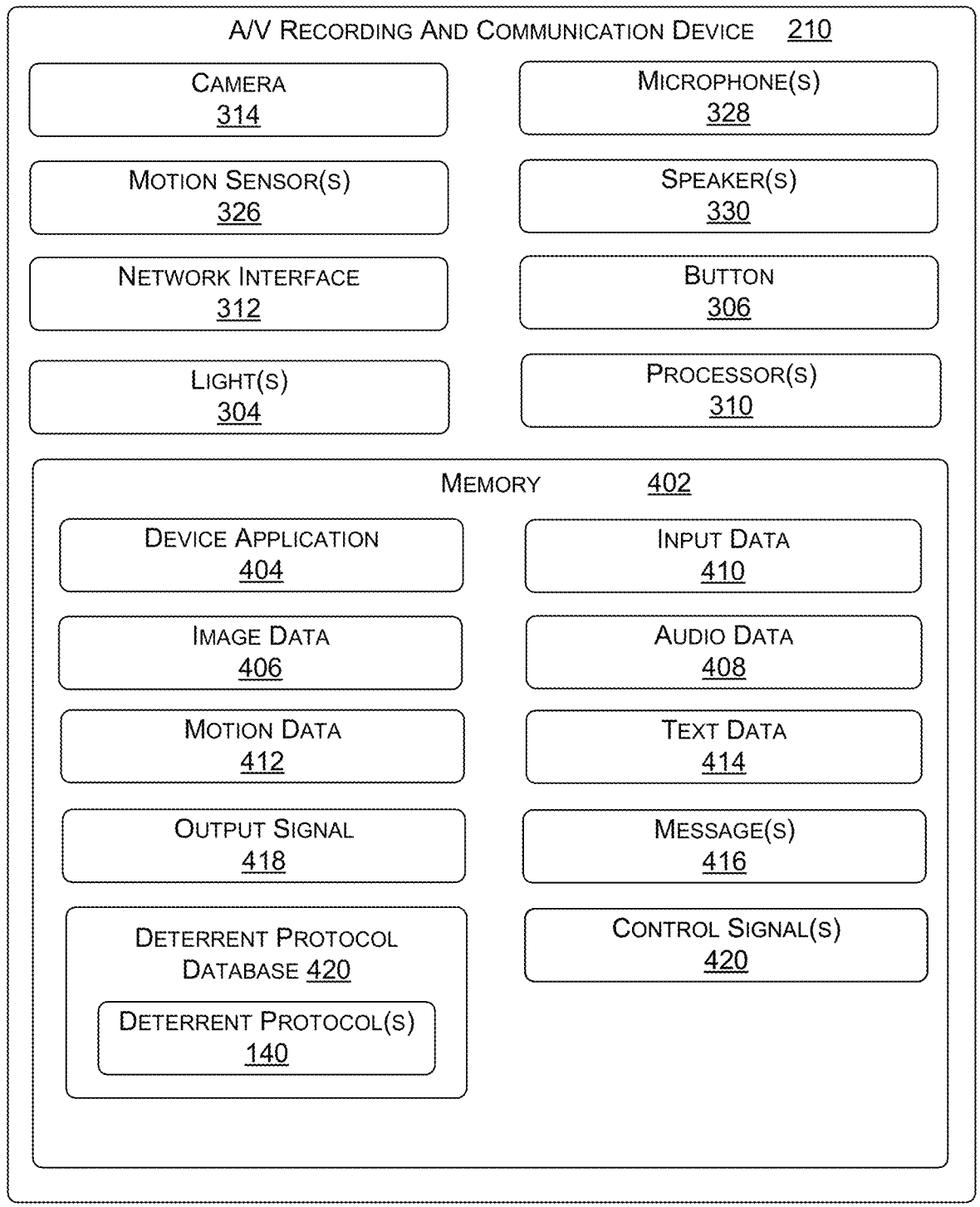
FIG. 4 is a functional block diagram illustrating one example embodiment of an A/V recording and communication device according to various aspects of the present disclosure.

FIG. 4 is another functional block diagram illustrating an embodiment of an A/V device 210 according to various aspects of the present disclosure. In some embodiments, the A/V device 210 may represent, and further include one or more of the components from, the A/V recording and communication doorbell 210(*c*), the A/V recording and communication security camera 210(*a*), and/or the floodlight controller 210(*b*). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 includes instructions, that when executed by the processor(s) 310, cause the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also include instructions, that when executed by the processor(s) 310, cause the processor(s) 310 to generate text data 414 describing the image data 406, the audio data 408, and/or the input data 410, such as in the form of metadata, for example.

In addition, the device application 404 may also include instructions that, when executed by the processor(s) 310, cause the processor(s) 310 to transmit the image data 406, the audio data 408, the motion data 412, the input data 410, the text data 414, and/or message(s) 416 to the client devices 214, 216, the hub device 202, and/or the backend device 224 using the network interface 312. In various embodiments, the device application 404 may also include instructions that, when executed by the processor(s) 310, cause the processor(s) 310 to generate and transmit an output signal 418 that may include the image data 406, the audio data 408, the text data 414, the input data 410, and/or the motion data 412. In some of the present embodiments, the output signal 418 may be transmitted to the backend device 224 and/or the hub device 202 using the network interface 312, and the backend device 224 and/or the hub device 202 may transmit (or forward) the output signal 418 to the client device 214, 216 and/or the backend device 224 may transmit the output signal 418 to the hub device 202. In other embodiments, the output signal 418 may be transmitted directly to the client device 214, 216 and/or the hub device 202.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(*c*)), the A/V device 210 may not include the button 306, and the A/V device 210 may not generate the input data 410.

With further reference to FIG. 4, a message 416 may be generated by the processor(s) 310 and transmitted, using the network interface 312, to the client device 214, 216, the backend device 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, indications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or the one or more components of the network(s) of servers/backend devices 220). For instance, message(s) 416 may include push notifications, email messages, short message service (SMS) messages, multimedia messages (MMS), voicemail messages, video signals, audio signals, and/or any other type of electronic communication that an electronic device can send to another electronic device.

Although many examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc.

In embodiments, as noted, the A/V device 210 may detect motion and/or capture images via the motion sensor(s) and/or camera 314. The processor(s) 310 may thus prepare image data 406 and motion data 412 and forward the image data 406 and/or motion data 412, using the network interface 312, to one or more of the hub device 202, the backend device, and/or the lighting controller 230 in either an output signal 418 and/or message 416. The image data 406 and/or motion data 412 may be indicative of a security event, e.g., may be an indication of the presence of one or more persons on or near the premises 102 and/or the structure 104.

In response to the detected security event, the processor(s) 310 may receive a control signal 420 from either the hub device 202, the backend device 224, the controller 144, or the lighting controller 230. The control signal 420 may cause the A/V device 210 to activate one or more light(s) 304 (e.g., a floodlight) and/or the speaker(s) 330. Such activation of the light(s) 304 and/or speaker(s) 330 may be in accordance with a first action of a deterrent protocol 140 in response to the detected security event.

After a predetermined amount of time, e.g., a range of five to fifteen seconds, if the A/V device 210 continues to detect the presence of the one or more persons using the motion sensor(s) 326 and/or camera 314, then the processor(s) 310 may generate further image data 406 and/or motion data 412 and forward the image data 406 and/or motion data 412 to the hub device 202, backend device 224, controller 144, and/or lighting controller 230, indicating the continued detection of a security event. The A/V device 210 may then receive a control signal 420 in the from the hub device 202, the backend device 224, the controller 144, or the lighting controller 230 to instigate a second action in accordance with the deterrent protocol 140. The second action may include altering the activated light(s) 304 and/or the activated speaker(s) 330. Alternatively, or additionally, the second action may cause the A/V device 210 to activate the light(s) 304 or the speaker(s) 330, if either were not activated based upon the first action. In embodiments, if the A/V device 210 no longer detects the presence of the one or more persons via either the motion sensor(s) 326 and/or the camera 314, then an output signal 418 and/or a message 416 may be forwarded to the hub device 202, the backend device 224, the controller 140, and/or the lighting controller 230.

In embodiments, if the A/V device 210 is no longer detecting the presence of the one or more persons, via motion sensor(s) 326 and/or camera 314, the A/V device 210 may still receive a control signal 420 from the hub device 202, the backend device 224, the controller 140, or the lighting controller 230 to instigate additional actions of the deterrent protocol 140 based upon input from one or more sensors 114 and/or automation devices 116 that indicate the continued presence of the one or more persons. If no other sensors 114 and/or automation devices 116 are detecting the presence of the one or more persons, then the hub device 202, the backend device 224, the controller 144, or the lighting controller 230, may forward a control signal 420 to the A/V device 210 to deactivate the speaker(s) 330 and/or the light(s) 304 as the detected security event has ended.

In embodiments, the A/V device 210 may include a deterrent protocol database 420 that includes one or more deterrent protocols 140. Thus, based upon detected security events using the motion sensor(s) 326 and/or camera 314, and/or based on receiving control signal(s) 420, the A/V device 210, using the processor(s) 310, may initiate a deterrent protocol 140. The implemented deterrent protocol 140 may include multiple actions that may be implemented directly by the A/V device 210 to activate the light(s) 304 and/or the speaker(s) 330 as described herein. Messages 416 may be forwarded to one or more of the hub device 202, the backend device 224, the controller 144, and/or the lighting controller 230 indicating the detected security events and/or implemented deterrent protocol 140. Additionally, a message 416 may be forwarded to the client device 132 of the user 134, indicating the detected security event and/or implemented deterrent protocol.

Figure 5:
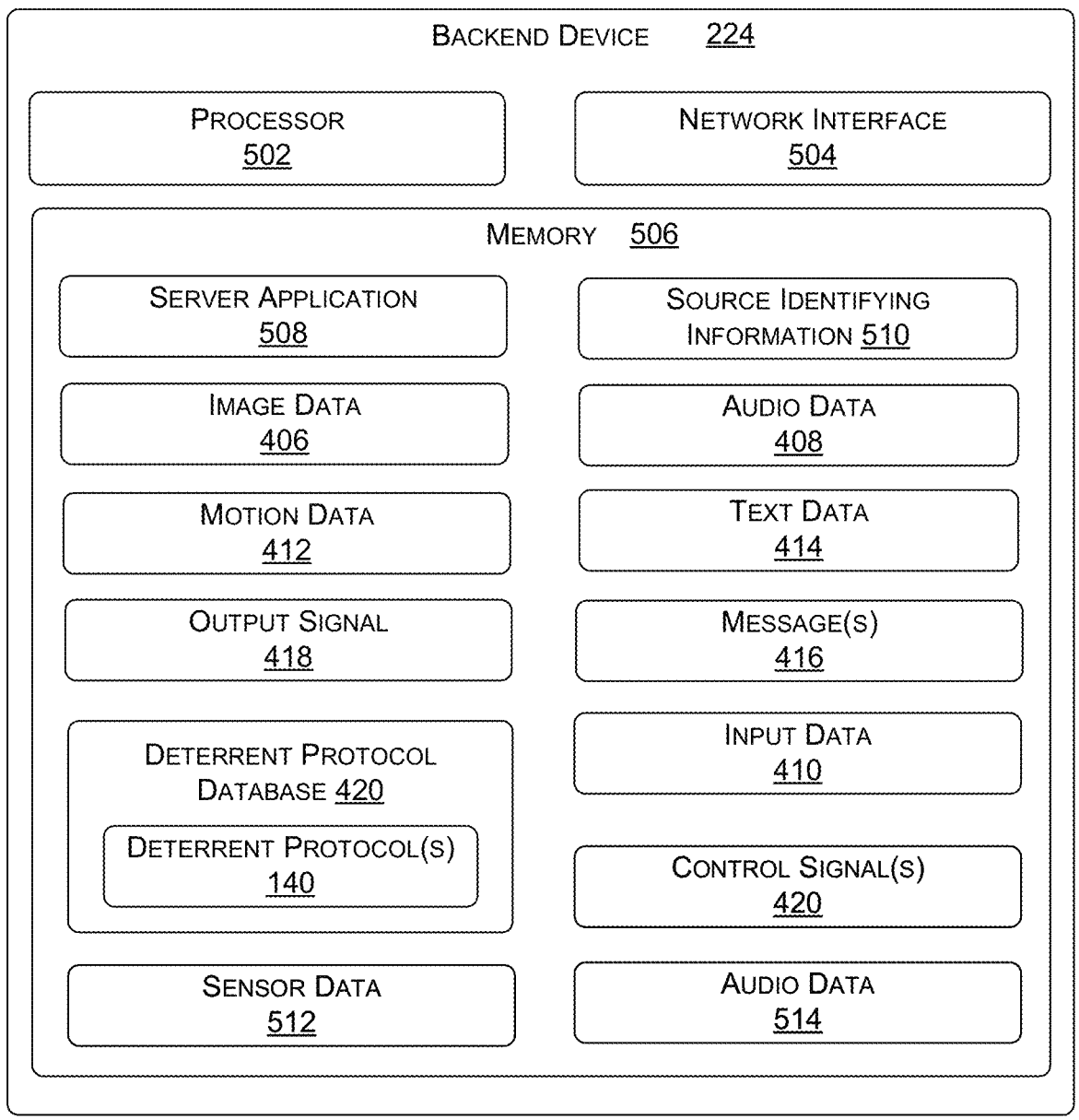
FIG. 5 is a functional block diagram illustrating one example embodiment of a backend device according to various aspects of the present disclosure.

FIG. 5 is a functional block diagram illustrating one embodiment of the backend device 224 according to various aspects of the present disclosure. The backend device 224 may comprise processor(s) 502 (which may be similar to, and/or include similar functionality as, the processor(s) 310), a network interface 504 (which may be similar to, and/or include similar functionality as, the network interface 312), and a memory 506 (which may be similar to, and/or include similar functionality as, the memory 402). The network interface 504 may allow the backend device 224 to access and communicate with devices connected to the network (Internet/PSTN) 212 (e.g., the A/V device 210, the hub device 202, the VA device 208, the client devices 214, 216, a device controlled by the security monitoring service 228, etc.).

The memory 402 may include a server application 508 that includes instructions that, when executed by the processor(s) 502, cause the processor(s) 502 to receive and/or retrieve the audio data 408, the text data 414, the input data 410, the messages 416, the image data 406, the motion data 412, and/or the control signal(s) 420 from the A/V device 210 (e.g., in the output signal 418) and/or the hub device 202. The server application 508 may also include instructions that, when executed by the processor(s) 502, cause the processor(s) 502 to transmit (and/or forward) the audio data 408, the text data 414, the input data 410, the messages 416, the image data 406, the control signals 420 and/or the motion data 412 to the client devices 214, 216 using the network interface 504. Furthermore, the server application 508 may also include instructions that, when executed by the processor(s) 502, cause the processor(s) 502 to transmit, using the network interface 504, the control signal(s) 420 to one or more electronic devices (e.g., the A/V device 210, the automation devices 206, the sensors 204, the lighting controller 230, the light emitters 232, etc.).

Although referred to as the backend device 224 with reference to the processes described herein, the backend device 224 may additionally, or alternatively, include one or more of the devices from the network(s) of servers/backend devices 220. For example, the processes described herein with respect to the backend device 224 may additionally, or alternatively, at least in part, be performed by one or more backend APIs 226.

In further reference to FIG. 5, the memory 506 may also include source identifying data 510 that may be used to identify the A/V device 210, the hub device 202, the VA device 208, the automation device(s) 206, the sensor(s) 204, the lighting controller 230, the light emitters 232, and/or the client devices 214, 216. In addition, the source identifying data 510 may be used by the processor(s) 502 of the backend device 224 to determine the client devices 214, 216 are associated with the A/V device 210, the automation devices 206, the sensors 204, the lighting controller 230, the light emitters 232, and/or the hub device 202.

In some embodiments, the server application 508 may further include instructions that, when executed by the processor(s) 502, cause the processor(s) 502 to generate and transmit a report signal (not shown) to a third-party client device (not shown), which may be associated with a law enforcement agency or the security monitoring service 228, for example. The report signal, which may be the message 416, in some examples, may include the image data 406, the audio data 408, the text data 414, and/or other data.

As described herein, at least some of the processes of the A/V device 210, the hub device 202, the VA device 208, and/or the client device 214, 216 may be executed by the backend device 224. For example, the backend device 224 may implement deterrent protocols 140, either directly or by communicating with one or more of the hub device 202, the lighting controller 230, the controller 144, and/or one or more A/V devices 210. In addition, the hub device 202, the lighting controller 230, the controller 144, and/or the backend device 224 (and/or one or more additional or alternative components of the network(s) of servers/backend devices 220) may alternatively be referred to herein as a "network device" and/or "network devices".

In embodiments, the backend device 224 may include the deterrent protocol database 420 that stores one or more deterrent protocols 140. The deterrent protocols 140 may be received from other devices, e.g., the hub device 202, the controller 144, and/or the lighting controller 230. Additionally, in embodiments, the client devices 214, 216, e.g., the client device 132 of the user 134, may provide the deterrent protocols 140 to the backend device 224. The processor 502 may transmit, using the network interface 504, the deterrent protocols 140 to other devices, e.g., the hub device 202, the controller 144, and/or the lighting controller 230.

In embodiments, the backend device 224 may also share the deterrent protocols with the A/V device 210 and/or the client devices 214, 216, e.g., the client device 132 of the user 134. For example, one or more of the deterrent protocols 140 may be default deterrent protocols 140 provided by a supplier of the backend device 224, the security system and/or the lighting system 110. Additionally, in embodiments, the backend device 224 may receive updates to the deterrent protocols 140 from the client devices 214, 216, e.g., the client device 132 of the user 134, the hub device 202, the controller 144, and/or the lighting controller 230. The backend device 224 may transmit the updated deterrent protocols 140 to one or more of the hub device 202, the controller 144, the lighting controller 230, and/or the client devices 214, 216, e.g., the client device 132 of the user 134.

The backend server 224 may then utilize the deterrent protocol(s) 140 to control the activation of one or more electronic devices, such as the automation devices 206, the lighting controller 230, the light emitters 232, and/or the A/V devices 210. For example, the backend server 224 may receive, using the network interface 504, first data (e.g., motion data 412 from a first A/V device 210, image data 406 from a first A/V device 210, sensor data 512 from first sensor 204 and/or other electronic device) indicating that an object was detected (e.g., a security event). Based on the first data, the backend server 224 may implement one of the deterrent protocols 420. For a first example, the backend server 224 may cause an A/V device 210 and/or light emitter(s) 232 to activate to a first lighting state. In some examples, the first lighting state may correspond to the A/V device 210 and/or the light emitter(s) 232 emitting light using a steady state. In some examples, the first lighting state may correspond to the A/V device 210 and/or the light emitter(s) 232 emitting light using a pattern (e.g., flashing). To cause the A/V device 210 and/or the light emitter(s) 232 to activate to the first lighting state, the backend server 224 may transmit, using the network interface 504, control signal(s) 420 to the A/V device 210, the light emitter(s) 232, and/or the lighting controller 230.

The backend server 224 may then receive, using the network interface 504, second data (e.g., motion data 412 from a first A/V device 210 and/or a second A/V device 210, image data 406 from a first A/V device 210 and/or a second A/V device 210, sensor data 512 from first sensor 204 and/or second sensor 204, and/or other electronic device) indicating that the object was again detected (e.g., a security event). Based on the second data, the backend server 224 may implement one of the deterrent protocols 420. For a first example, the backend server 224 may cause the A/V device 210 and/or the light emitter(s) 232 to switch from the first lighting state to a second lighting state. In some examples, switching from the first lighting state to the second lighting state may correspond to the A/V device 210 and/or the light emitter(s) 232 switching from emitting light using a steady state to emitting light using a pattern. In some examples, switching from the first lighting state to the second lighting state may correspond to the A/V device 210 and/or the light emitter(s) 232 switching from emitting light using a pattern to emitting light using a steady state. Still, in some examples, switching from the first lighting state to the second lighting state may correspond to the A/V device 210 and/or the light emitter(s) 232 switching from emitting light using a pattern to emitting light using a second, different pattern. To cause the A/V device 210 and/or the light emitter(s) 232 to switch to the second lighting state, the backend server 224 may transmit, using the network interface 504, control signal(s) 420 to the A/V device 210, the light emitter(s) 232, and/or the lighting controller 230.

In some examples, if the backend server 224 continues to receive, using the network interface 504, data (e.g., motion data 412, image data 406, sensor data 512) indicating that the object is detected, then the backend server 224 may continue to implement one or more deterrent protocols 140. For example, the backend server 224 may continue to cause the A/V device 210 and/or the light emitter(s) 232 to activate in a lighting state and/or change to a new lighting state. Additionally, in some examples, the backend server 224 may transmit a message 416 to the security monitoring service 228. In some examples, if the backend server 224 ceases receiving the data indicating that the object was detected, and/or receives, using the network interface 504, data indicating that the object is no longer located on a premises, the backend server 224 may cause the A/V device 210 and/or the lighting emitter(s) 232 to no longer emit light. To cause the A/V device 210 and/or the light emitter(s) 232 to no longer emit light, the backend server 224 may transmit, using the network interface 504, control signal(s) 420 to the A/V device 210, the light emitter(s) 232, and/or the lighting controller 230.

In some examples, in addition to, or alternatively from, causing the A/V device 210 and/or the light emitter(s) 232 to change lighting states, the backend server 224 may cause the A/V device 210 and/or another electronic device to change between speaker states. For a first example, based on the first data, the backend server 224 may transmit, using the network interface 504, a control signal 420 to the A/V device 210 that causes the A/V device 210 to operate in a first speaker state. The first speaker state may correspond to the A/V device 210 outputting first sound representing by first audio data 514. In some examples, the backend server 224 may further transmit, using the network interface 504, the first audio data 514 to the A/V device 210 (which may be along with the control signal 420). In some examples, the control signal 420 may indicate that the A/V device 210 is to output the first sound represented by the first audio data 514.

For a second example, based on the second data, the backend server 224 may transmit, using the network interface 504, a control signal 420 to the A/V device 210 that causes the A/V device 210 to operate in a second speaker state. The second speaker state may correspond to the A/V device 210 outputting second sound representing by second audio data 514. In some examples, the backend server 224 may further transmit, using the network interface 504, the second audio data 514 to the A/V device 210 (which may be along with the control signal 420). In some examples, the control signal 420 may indicate that the A/V device 210 is to output the second sound represented by the second audio data 514.

In some examples, if the backend server 224 continues to receive, using the network interface 504, data (e.g., motion data 412, image data 406, sensor data 512) indicating that the object is detected, then the backend server 224 may continue to implement one or more deterrent protocols 140. For example, the backend server 224 may continue to cause the A/V device 210 and/or another electronic device to activate in a speaker state and/or change to a new speaker state. In some examples, if the backend server 224 ceases receiving the data indicating that the object was detected, and/or receives, using the network interface 504, data indicating that the object is no longer located on a premises, the backend server 224 may cause the A/V device 210 and/or the other electronic device to no longer output sound. To cause the A/V device 210 and/or the other electronic device to no longer output sound the backend server 224 may transmit, using the network interface 504, control signal(s) 420 to the A/V device 210 and/or the other electronic device.

Figure 6:
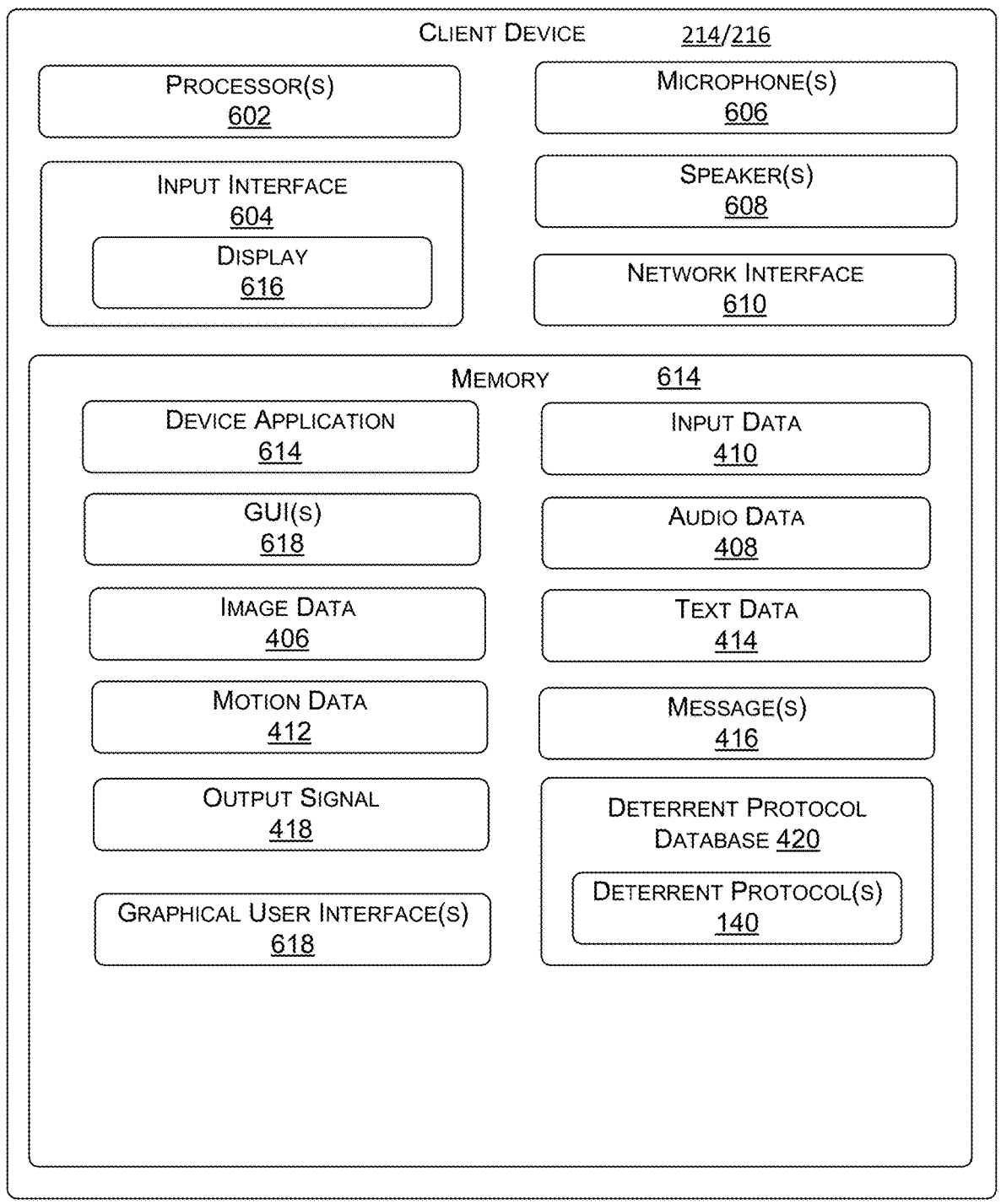
FIG. 6 is a functional block diagram illustrating one example embodiment of a client device according to various aspects of the present disclosure.

Now referring to FIG. 6, FIG. 6 is a functional block diagram illustrating one embodiment of the client device 214, 216, e.g., the client device 132 of the user 134, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a network interface 610 (which may be similar to, and/or include similar functionality as, the network interface 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may include instructions that, when executed by the processor(s) 602, cause the processor(s) 602 to receive input(s) to the input interface 604 (e.g., requests to create deterrent protocols 140, requests to update deterrent protocols 140, requests to delete deterrent protocols 140, etc.). In addition, the device application 614 may include instructions that, when executed by the processor(s) 602, cause the processor(s) 602 to receive, using the network interface 610, the input data 410, the image data 406, the audio data 408, the output signal 418, and/or the messages 416 from one or more of the A/V device 210, the hub device 202, the VA device 208, or the backend device 224.

With further reference to FIG. 6, the input interface 604 may include a display 616. The display 616 may include a touchscreen, such that the user of the client device 214, 216 may provide inputs directly to the display 616 (e.g., requests to create deterrent protocols 140, requests to update deterrent protocols 140, requests to delete deterrent protocols 140, etc.). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 616 to display the message 416. The message 416 may indicate that the A/V device 210 detected motion. While displaying the message 416, the input interface 604 may receive input from the user to answer the message 416. In response, the device application 614 may include instructions that, when executed by the processor(s) 602, cause the processor(s) 602 to display the received image data 406 on the display 616 (e.g., display video footage represented by the image data 406 on the display 616).

The client device 214, 216 may further include one or more graphical user interfaces (GUIs). The GUIs 618 may be used to access, control, and/or make updates to one or more components of the system 200 (e.g., the A/V device 210, the hub device 202, the VA device 208, the automation devices 206, the sensors 204, etc.). The GUIs 618 may be included within one or more device application(s) 614. For example, different components of the system 200 may have different device applications 614 for allowing access to, control of, and updates to the components. In some examples, the device application 614 may include a single application that is capable of access to, control of, and/or updates to some or all of the components of the system 200.

In embodiments, the client devices 214, 216, e.g., the client device 132 of the user 134, may use the processor 602 to implement a GUI 618, e.g., GUI 138, to allow the user 134 to input various parameters for one or more deterrent protocols 140. The GUI 618 may also allow the user to edit one or more deterrent protocols 140. The GUI 618 may be implemented when the processor(s) 602 execute instructions included in the device application 614.

For example, the GUI 618 may be displayed on the display 616. The user 134 may interact, using the input interface 604, with the GUI 618 and input at least one first input that indicates a first action for the deterrent protocol 140. The first action may include activating one or more light emitters 232, e.g., exterior light emitters 118, floodlight A/V device 124b, and/or interior light(s) 120, to a first lighting state and/or activating one or more speakers, e.g., speaker(s) 142 to a first speaker state. The user 134 may input at least one second input indicating a second action for the deterrent protocol 140. The second action may include activating one or more speaker(s) to a first speaker state or altering one or more speakers to a second speaker state, depending on the first action. Likewise, the second action may include activating one or more light emitters 232 to a first lighting state or altering one or more lights to a second lighting state, depending on the first action.

At least one third input indicating a third action for the deterrent protocol 140 may be input by the user 134. The third action may include activating the one or more light emitters 232 to the second lighting state, depending on the first and second actions, and/or activating the one or more speakers to the second speaker state, depending on the first and second actions. The user 134 may input at least one fourth input indicating a fourth action for the deterrent protocol. The fourth action may include activating the one or more light emitters 232 to the second lighting state, depending on the first, second, and third actions, and/or activating the one or more speakers to the second speaker state, depending on the first, second, and third actions.

The user 134 may input at least one fifth input indicating an order for implementation of the first action, the second action, the third action, and the fourth action. The user may also input at least one sixth input indicating criteria for the implementation of the first action, the second action, the third action, and the fourth action. At least one seventh input may be input by the user 134 indicating an amount of time between implementation of at least a first of the first action, the second action, the third action, and the fourth action and a second of the first action, the second action, the third action, and the fourth action. The complete deterrent protocol 140 may be transmitted, using the network interface 610, to a network device, e.g., the hub device 202, the backend device 224, the controller 144, and/or the lighting controller 230.

Figure 7:
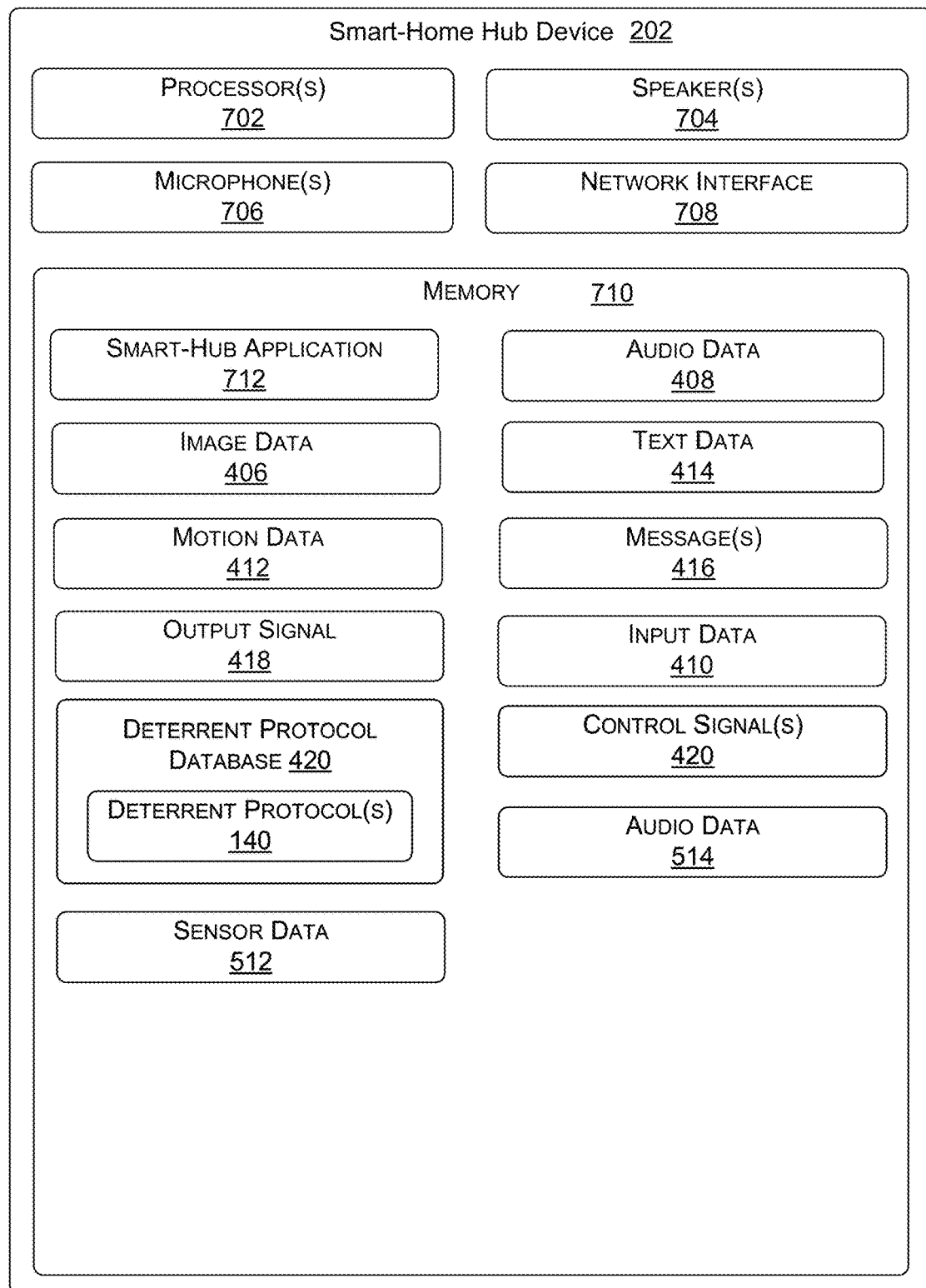
FIG. 7 is a functional block diagram illustrating one example embodiment of a smart-home hub device according to various aspects of the present disclosure.

FIG. 7 is a functional block diagram illustrating an embodiment of the smart-home hub device 202 (alternatively referred to herein as the "hub device 202") according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a network interface 708 (which may be similar to, and/or include similar functionality as, the network interface 312), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may include instructions that, when executed by the processor(s) 702, cause the processor(s) 702 to receive sensor data 512 from the sensors 204 and/or the automation devices 206. For example, the sensor data 512 may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data 512 may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may include instructions that, when executed by the processor(s) 702, cause the processor(s) 702 to receive the audio data 408, the text data 414, the image data 406, the motion data 412, the input data 410, the messages 416, and/or the control signal(s) 420, from the A/V device 210 (in some embodiments, via the backend device 224) using the network interface 708. For example, the hub device 202 may receive and/or retrieve (e.g., after receiving a signal from the A/V device 210 that the A/V device 210 has been activated) the image data 406, the input data 410, the motion data 412, and/or the control signal(s) 420 from the A/V device 210 and/or the backend device 224 in response to motion being detected by the A/V device 210. The smart-hub application 712 may further include instructions that, when executed by the processor(s) 702, cause the processor(s) 702 to transmit, using the network interface 708, the audio data 408, the text data 414, the image data 406, the motion data 412, the input data 410, the messages 416, and/or the control signal(s) 420 to the client device 214, 216, the backend device 224, and/or an additional electronic device (e.g., a second A/V device 210, the automation device(s) 206, the sensor(s) 204, etc.).

As described herein, at least some of the processes of the A/V device 210, the backend device 224, and/or the client device 214, 216 may be executed by the hub device 202. For example, the hub device 202 may include the deterrent protocol database 420, which stores the deterrent protocol(s) 140. The hub device 202 may then implement one or more of the deterrent protocol(s) 140 based on security events. For example, the hub device 202 may receive first data (e.g., image data 406, motion data 412, sensor data 512) indicating that an object has been detected (e.g., indicating a first security event). Based on the first data, the hub device may implement a first deterrent protocol 140. The first deterrent protocol 140 may include causing an A/V device 210 and/or light emitter(S) 232 to activate in a first lighting state, and/or the first deterrent protocol 140 may include causing the A/V device 210 and/or another electronic device to operate in a first speaker state. The hub device 202 may receive further receive second data (e.g., image data 406, motion data 412, sensor data 512) indicating that the object is still being detected (e.g., indicating a second security event). Based on the second data, the hub device may implement further implement the first deterrent protocol 140 and/or a second deterrent protocol 140. The first deterrent protocol 140 and/or the second deterrent protocol 140 may include causing the A/V device 210 and/or the light emitter(S) 232 to activate in a second lighting state, and/or the first deterrent protocol 140 and/or the second deterrent protocol 140 may include causing the A/V device 210 and/or another electronic device to operate in a second speaker state.

In some examples, if the hub device 202 continues to receive, using the network interface 708, data (e.g., motion data 412, image data 406, sensor data 512) indicating that the object is detected, then the hub device 202 may continue to implement one or more deterrent protocols 140. For example, the hub device 202 may continue to cause the A/V device 210 and/or the light emitter(s) 232 to activate in a lighting state and/or change to a new lighting state, and/or the hub device 202 may continue to cause the A/V device 210 and/or another electronic device to activate in a speaker state and/or change to a new speaker state. Additionally, in some examples, the hub device 202 may transmit a message 416 to the security monitoring service 228. In some examples, if the hub device 202 ceases receiving the data indicating that the object was detected, and/or receives, using the network interface 708, data indicating that the object is no longer located on a premises, the hub device 202 may cause the A/V device 210 and/or the lighting emitter(s) 232 to no longer emit light, and/or the hub device 202 may cause the A/V device 210 and/or the other electronic device to no longer output sound.

Each of the processes described herein, including the processes 800, 900, and 1000 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
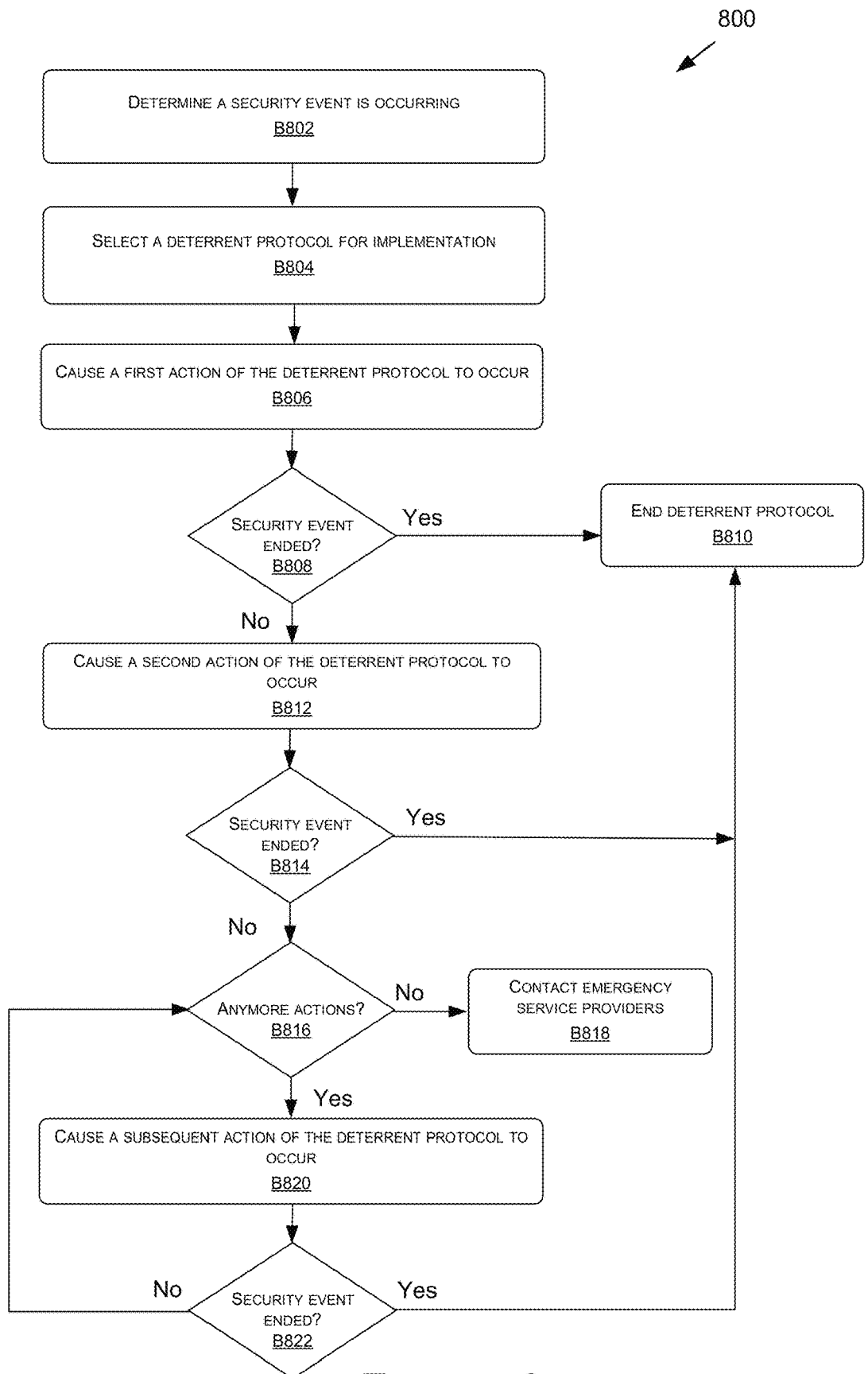
FIG. 8 is a flowchart illustrating an example process for implementing a deterrent protocol within a security system, according to various aspects of the present disclosure.

FIG. 8 is a flowchart illustrating an example process 800 for implementing a deterrent protocol within a security system. For example, a deterrent protocol 140 may be implemented within a local network and/or security system based upon a detected security event. The process 800, at block B802 determines that a security event is occurring. For example, the hub device 202 (and/or the backend server 224) may receive image data 406 from an A/V device 210, motion data 412 from the A/V device 210, and/or sensor data 204 from a sensor 204 and/or other electronic device (e.g., lighting element 232). The image data 406, the motion data 412, and/or the sensor data 512 may indicate the presence of one or more objects on or near a premises (e.g., the premises 102). Based on the image data 406, motion data 412, and/or the sensor data 512, the hub device 202 (and/or the backend server 224) may determine that a security event is occurring.

The process 800, at block B804, selects a deterrent protocol for implementation. For example, the hub device 202 (and/or the backend server 224) may include a deterrent protocol database 420 that includes one or more deterrent protocols 140. Each deterrent protocol 140 includes multiple actions that may be instigated by the hub device 202 (and/or the backend server 224) in response to a security event. For example, the actions may include activating one or more light emitters 232, A/V device(s) 210, and/or interior lights 120 to a first lighting state. The actions may also include altering activation of activated lights to a second lighting state. Likewise, the actions may include activating one or more speakers 142 and/or A/V device(s) 210 to a first speaker state. The actions may also include altering activation of activated speakers 142 and/or A/V device(s) 210 to a second speaker state.

The process 800, at block B806, cause a first action of the deterrent protocol to occur. For example, the hub device 202 (and/or the backend sever 224) may activate one or more exterior light emitters 232, A/V device(s) 210, and/or interior lights 120 as a first action of the deterrent protocol 140. In some examples, the hub device 202 (and/or the backend server 224) may activate the one or more exterior light emitters 232, A/V device(s) 210, and/or interior lights 120 by transmitting control signal(s) 420 to the one or more exterior light emitters 232, A/V device(s) 210, and/or interior lights 120. Alternatively, or additionally, the hub device 202 (and/or the backend server 224) may activate one or more speakers 142 and/or A/V device(s) 210 to a first speaker state as a first action of the deterrent protocol 140. In some examples, the hub device 202 (and/or the backend server 224) may activate the one or more speakers 142 and/or A/V device(s) 210 by transmitting control signal(s) 420 to the one or more speakers 142 and/or A/V device(s) 210.

The process 800, at B808, determines if the security event has ended. For example, after a predetermined amount of time, if the hub device 202 (and/or the backend server 224) is no longer receiving image data 406 and/or motion data 412 from an A/V device 124, as well as not receiving sensor data 512 from sensors 202 and/or other electronic devices, then the hub device 202 (and/or the backend server 224) may determine that the security event has ended. Thus, the process 800, proceeds to block B810, where the deterrent protocol is ended.

Alternatively, during the predetermined amount of time, the hub device 202 (and/or the backend server 224) may still be receiving image data 406 and/or motion data 412 from an A/V device 124, and/or sensor data 512 from sensor 204 and/or other electronic devices. Such receipt of data by the hub device 202 (and/or the backend server 224) may indicate that the security event continues to occur. If the hub device 202 (and/or the backend server 224) is continuing to receive such data, then the hub device 202 (and/or the backend server 224) may determine that the security event is continuing to occur. In such a situation, the process 800 continues to block B812.

The process 800, at block B812, causes a second action of the deterrent protocol to occur. For example, the hub device 202 (and/or the backend server 224) may cause the second action of the deterrent protocol 140 to occur. In some examples, the second action may include changing a state of the one or more exterior light emitters 232, A/V device(s) 210, and/or interior lights 120 from the first lighting state to a second lighting state. In some examples, the second action may include changing a state of the one or more speakers 142 and/or A/V device(s) 210 from the first speaker state to a second speaker state. In some examples, the second action may include activating the one or more exterior light emitters 232, A/V device(s) 210, and/or interior lights 120 in a lighting state if the one or more exterior light emitters 232, A/V device(s) 210, and/or interior lights 120 are not already activated in a lighting state. Still, in some examples, the second action may include activating the one or more speakers 142 and/or A/V device(s) 210 to a speaker state if the one or more speakers 142 and/or A/V device(s) 210 are not already activated in a speaker state.

The process 800, at block B814, determines if the security event has ended. If, as previously described, after a predetermined amount of time, the hub device 202 (and/or the backend server 224) is no longer receiving image data 406 and/or motion data 412 from an A/V device 124, as well as not receiving sensor data 512 from sensors 204 and/or the other electronic devices, then the hub device 202 (and/or the backend server 224) may determine that the security event has ended. Thus, the process 800, proceeds to block B810 where the deterrent protocol is ended.

During the predetermined amount of time, the hub device 202 (and/or the backend server 224), as previously described, may still be receiving image data 406 and/or motion data 412 from an A/V device 124, and/or receiving sensor data 512 from the sensors 204 and/or other electronic devices. Such receipt of data by the hub device 202 (and/or the backend server 224) may indicate that the security event continues to occur. If the hub device 202 (and/or the backend server 224) is continuing to receive such data, then the hub device 202 (and/or the backend server 224) may determine that the security event is continuing to occur. In such a situation, the process 800, at block B816, determines if there are any more actions defined by the deterrent protocol to be instigated. If there are no further actions to be instigated, then the hub device 202 (and/or the backend server 224, may contact, at block B818, emergency service providers.

If there are more actions defined within the deterrent protocol, then the process 800, at block B820, causes a subsequent action of the deterrent protocol to occur. For example, the hub device 202 (and/or the backend server 224) may cause the subsequent action of the deterrent protocol 140 to occur. In some examples, the subsequent action may include changing a state of the one or more exterior light emitters 232, A/V device(s) 210, and/or interior lights 120 to a new lighting state. In some examples, the subsequent action may include changing a state of the one or more speakers 142 and/or A/V device(s) 210 to a new speaker state. In some examples, the subsequent action may include activating the one or more exterior light emitters 232, A/V device(s) 210, and/or interior lights 120 to a lighting state if the one or more exterior light emitters 232, A/V device(s) 210, and/or interior lights 120 are not already activated in a lighting state. Still, in some examples, the subsequent action may include activating the one or more speakers 142 and/or A/V device(s) 210 to a speaker state if the one or more speakers 142 and/or A/V device(s) 210 are not already activated in a speaker state.

The process 800, at block B822, determines if the security event has ended. If the security event has ended, as previously described, then the process 800, at block B810, ends the deterrent protocol. If the security event has not ended, then the process 800, at block B816, returns to block B816 to determine if there are any more actions defined within the deterrent protocol to be instigated. If yes, then the process 800 returns to block B820 to instigate a subsequent action of the deterrent protocol. If there are no more actions to be instigated, then the process 800, at block B818, contacts emergency service providers.

As an example, and referring to the example of FIG. 1, it may be determined that a security event is occurring on or near the premises 102. For example, motion may be detected by a motion sensor of an A/V device 124. The detection of motion may be an indication of the presence of one or more persons on or near the premises 102. Thus, based upon the detected motion, the hub device 112, upon receiving the indication of the detected motion from an A/V device 124, may determine that a security event is occurring on or near the premises 102. Alternatively, or additionally, a determination may be made by the network device 130, the controller 144 of the security system, and/or the A/V device 124 that detected the motion.

Upon determination that a security event is occurring, the hub device 112 may select a deterrent protocol 140 to implement. The deterrent protocol 140 may be located within a deterrent protocol database, e.g., deterrent protocol database 420. The implemented deterrent protocol 140 includes multiple actions to be instigated. For example, a first action may call for activation of one or more exterior light emitters 118, floodlight 124b, and/or one or more interior lights 120 to a first lighting state. Based upon the first action, the hub device 112 may send a control signal to the appropriate one or more exterior light emitters 118, the floodlight 124b, and/or the one or more interior lights 120 to activate them to a first lighting state.

During a predetermined amount of time, e.g., a range of five to fifteen seconds, if the hub device 112 is continuing to receive data, e.g., motion data, indicating the continued presence of the one or more persons on or near the premises 102, then the hub device 112 may instigate a second action of the deterrent protocol 140. The second action, for example, may include activating one or more speakers 142 to a first speaker state. Alternatively, or additionally, the second action may include altering any activated exterior light emitters 118, the floodlight 124b, and/or interior lights 120 to a second lighting state. During a predetermined amount of time, if the hub device 112 continues to receive motion data indicating the continued presence of the one or more persons on or near the premises 102, the hub device 112 may continue to instigate subsequent actions of the deterrent protocol 140. If all actions have been instigated and there continues to be an indication of the presence of the one or more persons on or near the premises 102, then the hub device 112 may contact emergency service responders.

Once the hub device 112 no longer receives motion data indicating the continued presence of the one or more persons on or near the premises 102, and if the hub device 112 is not receiving data from any other A/V devices 124, e.g., motion data and/or image data, and is not receiving data from any sensors 114 and/or automation devices 116 that indicate the presence of one or more persons on or near the premises 102, then the hub device 112 may discontinue implementation of the deterrent protocol 140. For example, the hub device 112 may deactivate, e.g., turn off, any activated lights and/or speakers.

While this example has been described with respect to the hub device 112, it is to be understood that the network device 130, the lighting controller 126, and/or the controller 144 of the security system may perform the actions described in this example with respect to the hub device 112. Additionally, instead of the hub device 112 directly implementing the deterrent protocol 140 and controlling the lights and/or speakers, the hub device 112 may instruct the network device 130, the lighting controller 126, and/or the controller 144 to implement and perform the functions defined by the deterrent protocol 140. Likewise, the network device 130 may perform the analysis with respect to determining if the security event exists (and continues to exist) and instruct the hub device 112, the lighting controller 126, and/or the controller 144 to implement the deterrent protocol 140 and perform the corresponding functions.

Figure 9:
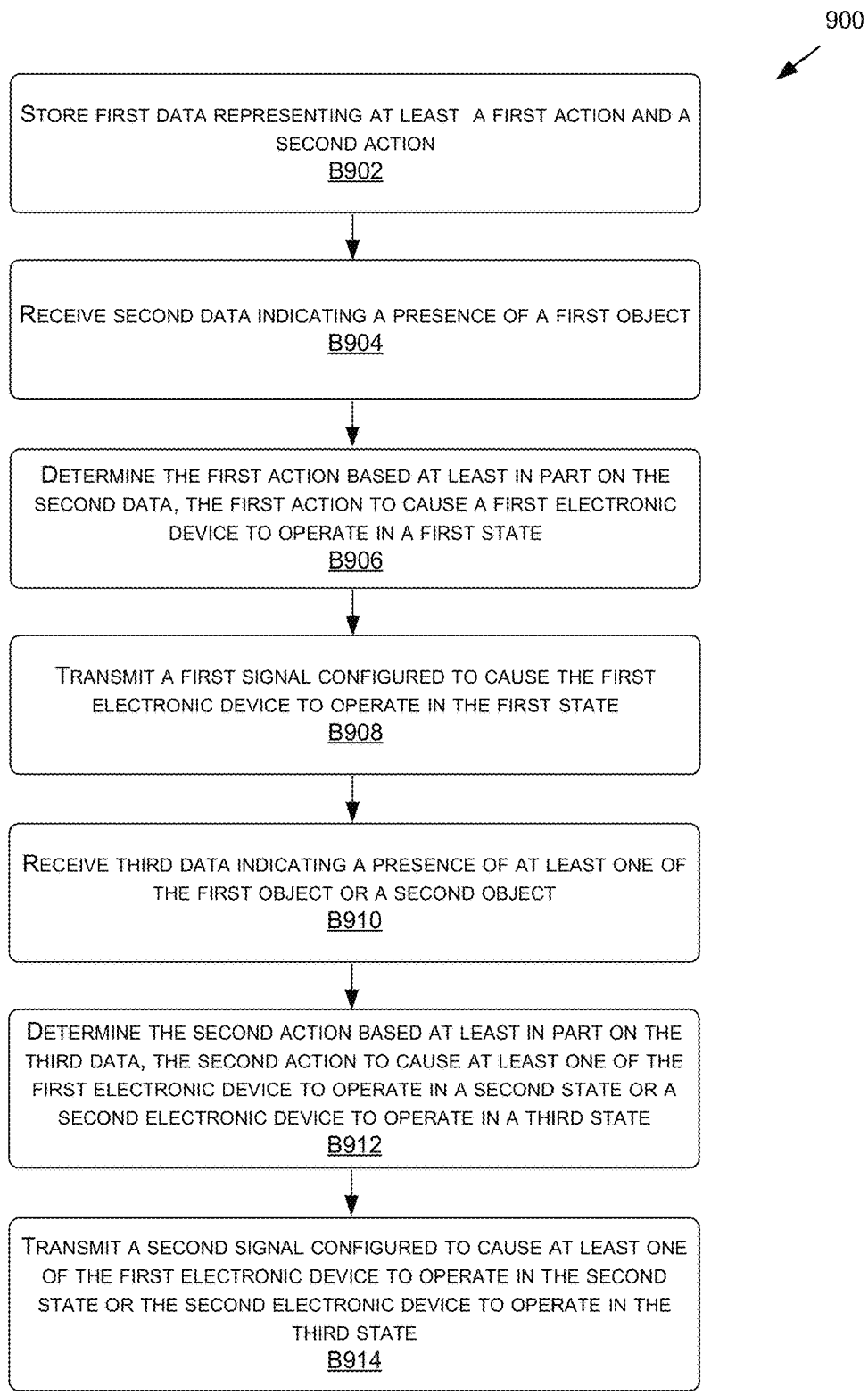
FIG. 9 is a flowchart illustrating a second example process for implementing a deterrent protocol within a security system, according to various aspects of the present disclosure.

FIG. 9 is a flowchart illustrating an example process 900 for implementing a deterrent protocol within a security system, according to various aspects to the present disclosure. For example, a deterrent protocol 140 may be implemented within a local network and/or security system based upon a detected security event. The process 900, at block B902, stores first data representing at least a first action and a second action. For example, the hub device 202 (and/or the backend server 224) may store data relating to a first action of the deterrent protocol 140, where the first action may include, for example, the hub device 202 (and/or the backend sever 224) activating one or more exterior light emitters 232, A/V device(s) 210, and/or interior lights 120 as the first action of the deterrent protocol 140. Alternatively, the first action may include, for example, the hub device 202 (and/or the backend server 224) activating one or more speakers 142 and/or A/V device(s) 210 to a first speaker state as the first action of the deterrent protocol 140. In some examples, the hub device 202 (and/or the backend server 224) may store data relating to a second action of the deterrent protocol 140, where the second action may include changing a state of the one or more exterior light emitters 232, A/V device(s) 210, and/or interior lights 120 to a new lighting state. In some examples, the second action may include changing a state of the one or more speakers 142 and/or A/V device(s) 210 to a new speaker state. In some examples, the second action may include activating the one or more exterior light emitters 232, A/V device(s) 210, and/or interior lights 120 to a lighting state if the one or more exterior light emitters 232, A/V device(s) 210, and/or interior lights 120 are not already activated in a lighting state. Still, in some examples, the second action may include activating the one or more speakers 142 and/or A/V device(s) 210 to a speaker state if the one or more speakers 142 and/or A/V device(s) 210 are not already activated in a speaker state.

The process 900, at block B904, receives second data indicating a presence of a first object. For example, the hub device 202 (and/or the backend server 224) may receive second data in the form of image data 406 from an A/V device 210, motion data 412 from the A/V device 210, and/or sensor data 204 from a sensor 204 and/or other electronic device (e.g., lighting element 232). The image data 406, the motion data 412, and/or the sensor data 512 may indicate the presence of the first object on or near a premises (e.g., the premises 102).

The process 900, at block B906, determines the first action based at least in part on the second data, the first action to cause a first electronic device to operate in a first state. For example, the hub device 202 (and/or the backend server 224) may activate one or more exterior light emitters 232, A/V device(s) 210, and/or interior lights 120 as the first action of the deterrent protocol 140. In some examples, the hub device 202 (and/or the backend server 224) may activate the one or more exterior light emitters 232, A/V device(s) 210, and/or interior lights 120 by transmitting control signal(s) 420 to the one or more exterior light emitters 232, A/V device(s) 210, and/or interior lights 120. Alternatively, the hub device 202 (and/or the backend server 224) may activate one or more speakers 142 and/or A/V device(s) 210 to a first speaker state as a first action of the deterrent protocol 140. In some examples, the hub device 202 (and/or the backend server 224) may activate the one or more speakers 142 and/or A/V device(s) 210 by transmitting control signal(s) 420 to the one or more speakers 142 and/or A/V device(s) 210.

The process 900, at block B908, transmits a first signal configured to cause the first electronic device to operate in the first state. For example, the hub device 202 (and/or the backend server 224) may transmit one or more control signal(s) 420 to the one or more exterior light emitters 232, A/V device(s) 210, and/or interior lights 120 to cause the one or more exterior light emitters 232, A/V device(s) 210, and/or interior lights 120 to operate in the first state. Alternatively, the hub device 202 (and/or the backend server 224) may transmit one or more control signal(s) 420 to the one or more speakers 142 and/or A/V device(s) 210 to cause the one or more speakers 142 and/or A/V device(s) 210 operate in the first state.

The process 900, at block B910, receives third data indicating a presence of at least one of the first object or a second object. For example, the hub device 202 (and/or the backend server 224) may receive third data in the form of image data 406 from an A/V device 210, motion data 412 from the A/V device 210, and/or sensor data 204 from a sensor 204 and/or other electronic device (e.g., lighting element 232). The image data 406, the motion data 412, and/or the sensor data 512 may indicate the presence of the first object or a second object, e.g., a new object, on or near a premises (e.g., the premises 102). The third data may be the same type of data as (or may be different than), the type of data of the second data received at block B904. Likewise, the third data may be received from the same A/V device 210, sensor 204, and/or other electronic device that provided the second data, or may be received from a different A/V device 210, sensor 204, and/or other electronic device than the A/V device 210, sensor 204, and/or other electronic device that provided the second data.

The process 900, at block B912, determines the second action based at least in part on the third data, the second action to cause at least one of the first electronic device to operate in a second state or a second electronic device to operate in a third state. For example, the hub device 202 (and/or the backend server 224) may determine the second action of the deterrent protocol 140 based at least in part on the third data and may cause one or more exterior light emitters 232, A/V device(s) 210, and/or interior lights 120 to operate in a new lighting state, e.g., change from operating in a first state to operating in a second state. In some examples, the second action may include changing a state of the one or more speakers 142 and/or A/V device(s) 210 to a new speaker state, e.g., change from operating in a first state to operating in a second state. In some examples, the second action may include activating the one or more exterior light emitters 2322, A/V device(s) 210, and/or interior lights 120 to a lighting state if the one or more exterior light emitters 232, A/V device(s) 210, and/or interior lights 120 are not already activated in a lighting state, e.g., change from not operating to operating in a third state. Still, in some examples, the second action may include activating the one or more speakers 142 and/or A/V device(s) 210 to a speaker state if the one or more speakers 142 and/or A/V device(s) 210 are not already activated in a speaker state, e.g., change from not operating to operating in a third state.

The process 900, at block B914, transmits a second signal configured to cause at least one of the first electronic device to operate in the second state or the second electronic device to operate in the third state. For example, the hub device 202 (and/or the backend server 224) may transmit one or more control signal(s) 420 to the one or more exterior light emitters 118232 A/V device(s) 210, and/or interior lights 120 to cause the one or more exterior light emitters 232, A/V device(s) 210, and/or interior lights 120 to operate in a new lighting state, e.g., change from operating in a first state to operating in the second state, or change from not operating to operating in the third state. Alternatively, the hub device 202 (and/or the backend server 224) may transmit one or more control signal(s) 420 to the one or more speakers 142 and/or A/V device(s) 210 to cause the one or more speakers 142 and/or A/V device(s) 210 operate in a new speaker state, e.g., change from operating in the first state to operating in the second state, or change from not operating to operating in the third state.

Figure 10:
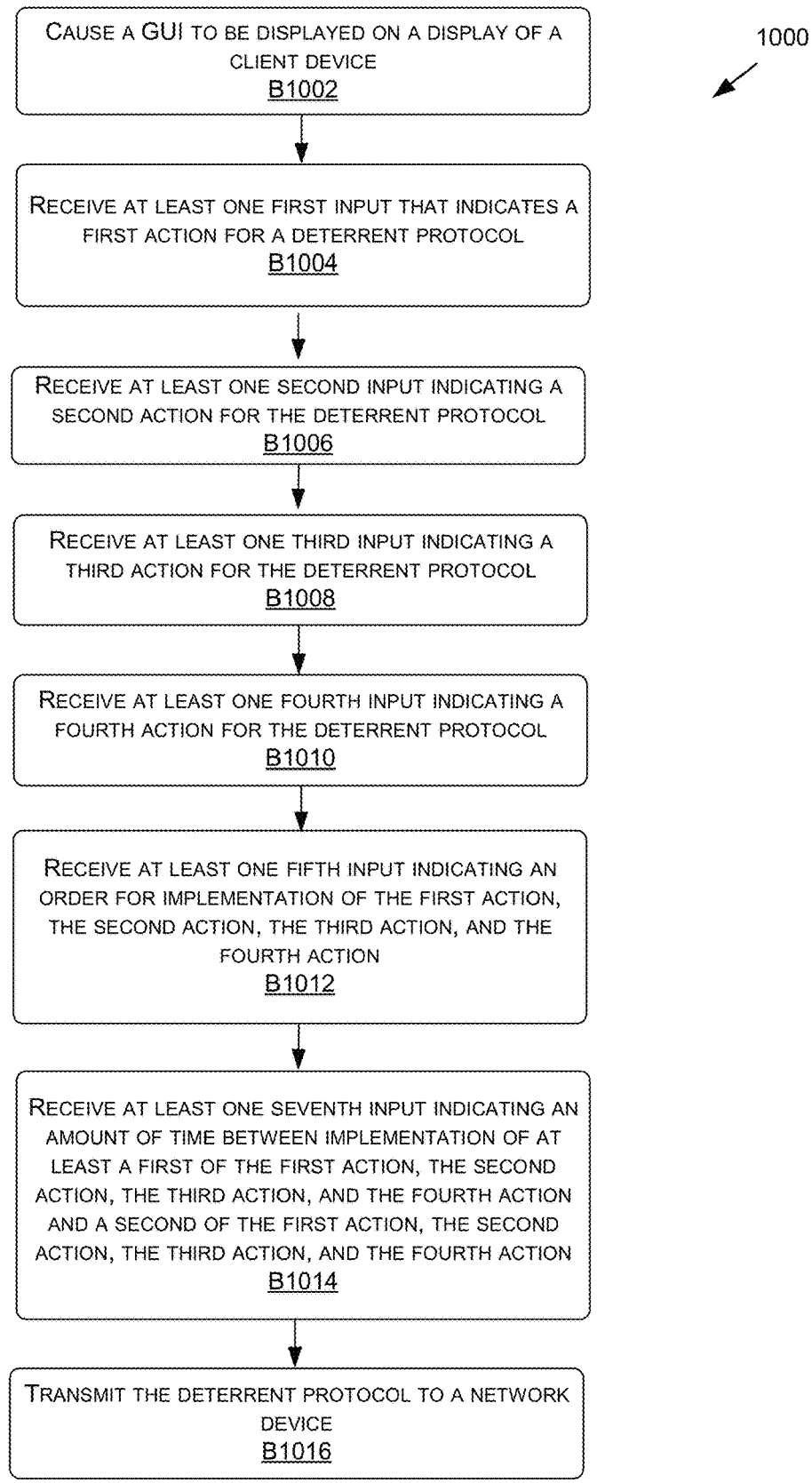
FIG. 10 is a flowchart illustrating an example process for creating a deterrent protocol according to various aspects of the present disclosure.

FIG. 10 is a flowchart illustrating an example process 1000 for creating a deterrent protocol. The process 1000, at block B1002, causes a GUI to be displayed on a display of a client device. For example, the client device 214, 216 may display a GUI 618 on the display 616. The GUI 618 may be for creating deterrent protocols 140, updating deterrent protocols 140, and/or removing deterrent protocols 140.

The process 1000, at block B1004, receives at least one first input that indicates a first action for a deterrent protocol. For example, the client device 214, 216 may receive, using the input interface 604, at least a first input indicating a first action for a deterrent protocol 140. In some examples, the first action may include activating one or more lights, e.g., exterior light emitters 232, an A/V device 210, and/or interior light(s) 120 to a first lighting state. The first lighting state may correspond to the one or more lights flashing using a first pattern or the first lighting state may include the one or more lights emitting light at a steady state.

The process 1000, at block B1006, receives at least one second input indicating a second action for the deterrent protocol. For example, the client device 214, 216 may receive, using the input interface 604, at least a second input indicating a second action for a deterrent protocol 140. In some examples, the second action may include activating the one or more lights to a second lighting state. The second lighting state may correspond to the one or more lights flashing using a second pattern or the second lighting state may include the one or more lights emitting light at a steady state.

The process 1000, at block B1008, receives at least one third input indicating a third action for the deterrent protocol. For example, the client device 214, 216 may receive, using the input interface 604, at least a third input indicating a third action for a deterrent protocol 140. The third action may include activating one or more speakers, e.g., speaker(s) 142 and/or speaker(s) 330 of an A/V device 210, to a first speaker state. The first speaker state may correspond to the one or more speakers outputting first audio.

The process 1000, at block B1010, receives at least one fourth input indicating a fourth action for the deterrent protocol. For example, the client device 214, 216 may receive, using the input interface 604, at least a fourth input indicating a fourth action for a deterrent protocol 140. In some examples, the fourth action may include activating the one or more speakers in a second speaker state. The second state may correspond to the one or more speakers outputting second audio. In some examples, the A/V device 210 outputting the second audio may correspond to the A/V device 210 outputting a siren sound using the speaker(s) 330.

The process 1000, at block, B1012, receives at least one fifth input indicating an order for implementation of the first action, the second action, the third action, and the fourth action. For example, the client device 214, 216 may receive, using the input interface 604, at least a fifth input indicating an order for the first action, the second action, the third action, and the fourth action. For example, the at least one fifth input may indicate that the first action is to be performed first, the second action is to be performed second, the third action is to be performed third, and the fourth action is to be performed fourth. While this is just one example, the at least one fifth input may indicate any order for the first action, the second action, the third action, and the fourth action. Additionally, in some examples, the at least one fifth input may indicate that two or more of the actions are to occur concurrently (e.g., the first action and the second action are to both occur first).

The process 1000, at block B1014, receives at least one seventh input indicating an amount of time between implementation of at least a first of the first action, the second action, the third action, and the fourth action and a second of the first action, the second action, the third action, and the fourth action. For example, the client device 214, 216 may receive, using the input interface 604, at least a seventh input indicating an amount of time between implementation of at least a first of the first action, the second action, the third action, and the fourth action and a second of the first action, the second action, the third action, and the fourth action. As discussed herein, the amount of time may include a time range and/or the amount of time may include a threshold amount of time.

The process 1000, at block B1016, transmit the deterrent protocol to a network device. For example, based on the inputs, the client device 214, 216 may generate data representing the deterrent protocol 140. The client device 214, 216 may then transmit the data to the hub device 202, the backend server 224, and/or another electronic device for implementation. Additionally, in some examples, the client device 214, 216 may store the data in the memory 614.

The processes described herein are directed to implementing deterrent protocols 140 in response to security events occurring at a premises (e.g., the premises 140), such as to cause an object (e.g., a person, an animal, etc.) to leave the premises. For example, the deterrent pattern 140 may indicate various actions to take when security events occur. The actions may include activating various states of light emitters (e.g., light emitters 232, lights emitters 120, lights 304 of an A/V device 210, etc.) and/or activating various states of speakers (e.g., speakers 142, speaker(S) 330 of an A/V device 210, etc.). In some examples, a network device (e.g., the hub device 202, the backend server 224, etc.) may implement different actions based on how long the object is located on the premises and/or based on which electronic device (e.g., an A/V device 210, sensor 204, automation device 206, a light emitter 232, etc.) detected the object. Once it has been determined that the object is no longer located on the premises, the network device may cease implementing the deterrent protocol 140.

Therefore, it should be readily apparent that use of the various embodiments described herein may be beneficial in deterring and/or scaring off intruders. Such a deterrent may be extremely beneficial in preventing potential crimes, damage, unnecessary use of emergency service responders, etc. For example, arrival of emergency service responders once the intruders have left, and if no crime has been committed, may result in a fee being owed by the user to the emergency service responders. Accordingly, crime may be reduced in neighborhoods and safety in homes may be increased.

Figure 11:
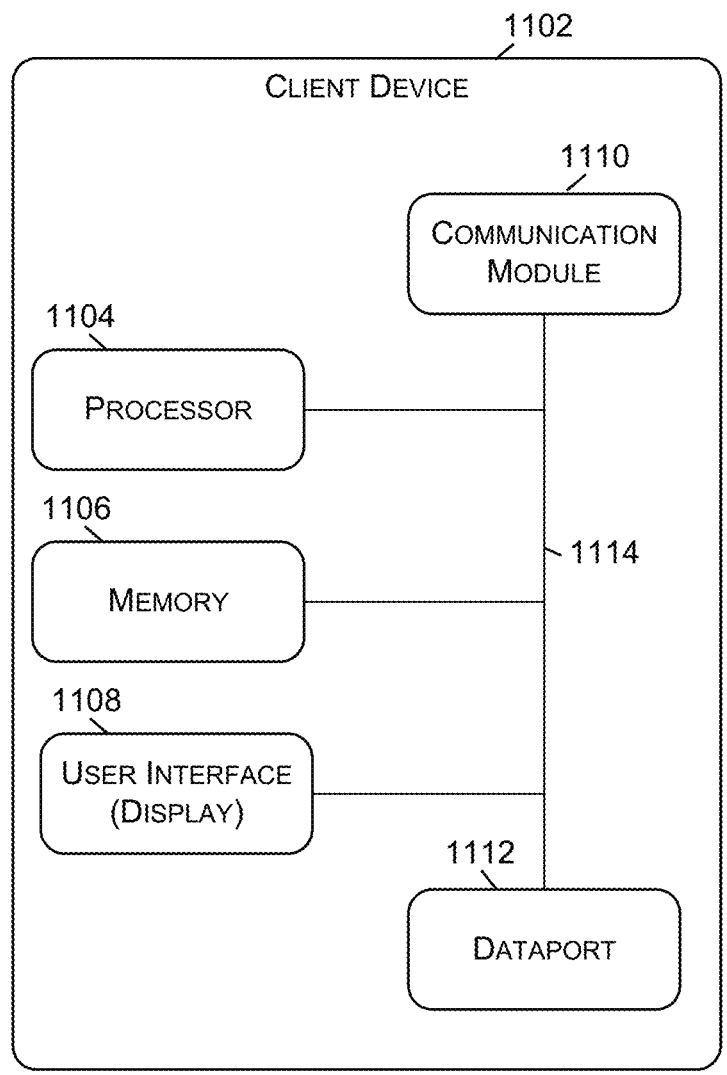
FIG. 11 is a functional block diagram of a client device on which the present embodiments may be implemented according to various aspects of the present disclosure.

FIG. 11 is a functional block diagram of a client device 1102 on which the present embodiments may be implemented according to various aspects of the present disclosure. The client device(s) 214, 216 described with reference to FIG. 2 may include some or all of the components and/or functionality of the client device 1102. The client device 1102 may comprise, for example, a smartphone.

With reference to FIG. 11, the client device 1102 includes a processor 1104, a memory 1106, a user interface 1108, a network interface 1110, and a dataport 1112. These components are communicatively coupled together by an interconnect bus 1114. The processor 1104 may include any processor used in smartphones and/or portable computing devices, such as an ARM processor (a processor based on the RISC (reduced instruction set computer) architecture developed by Advanced RISC Machines (ARM).). In some embodiments, the processor 2004 may include one or more other processors, such as one or more conventional microprocessors, and/or one or more supplementary co-processors, such as math co-processors.

The memory 1106 may include both operating memory, such as random-access memory (RAM), as well as data storage, such as read-only memory (ROM), hard drives, flash memory, or any other suitable memory/storage element. The memory 1106 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1104 and the memory 1106 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1104 may be connected to the memory 1106 via the dataport 1112.

The user interface 1108 may include any user interface or presentation elements suitable for a smartphone and/or a portable computing device, such as a keypad, a display screen, a touchscreen, a microphone, and a speaker. The network interface 1110 is configured to handle communication links between the client device 1102 and other, external devices or receivers, and to route incoming/outgoing data appropriately. For example, inbound data from the dataport 1112 may be routed through the network interface 1110 before being directed to the processor 1104, and outbound data from the processor 1104 may be routed through the network interface 1110 before being directed to the dataport 1112. The network interface 1110 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1112 may be any type of connector used for physically interfacing with a smartphone and/or a portable computing device, such as a mini-USB port or an IPHONE®/IPOD® 30-pin connector or LIGHTNING® connector. In other embodiments, the dataport 1112 may include multiple communication channels for simultaneous communication with, for example, other processors, servers, and/or client terminals.

The memory 1106 may store instructions for communicating with other systems, such as a computer. The memory 1106 may store, for example, a program (e.g., computer program code) adapted to direct the processor 1104 in accordance with the present embodiments. The instructions also may include program elements, such as an operating system. While execution of sequences of instructions in the program causes the processor 1104 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 12:
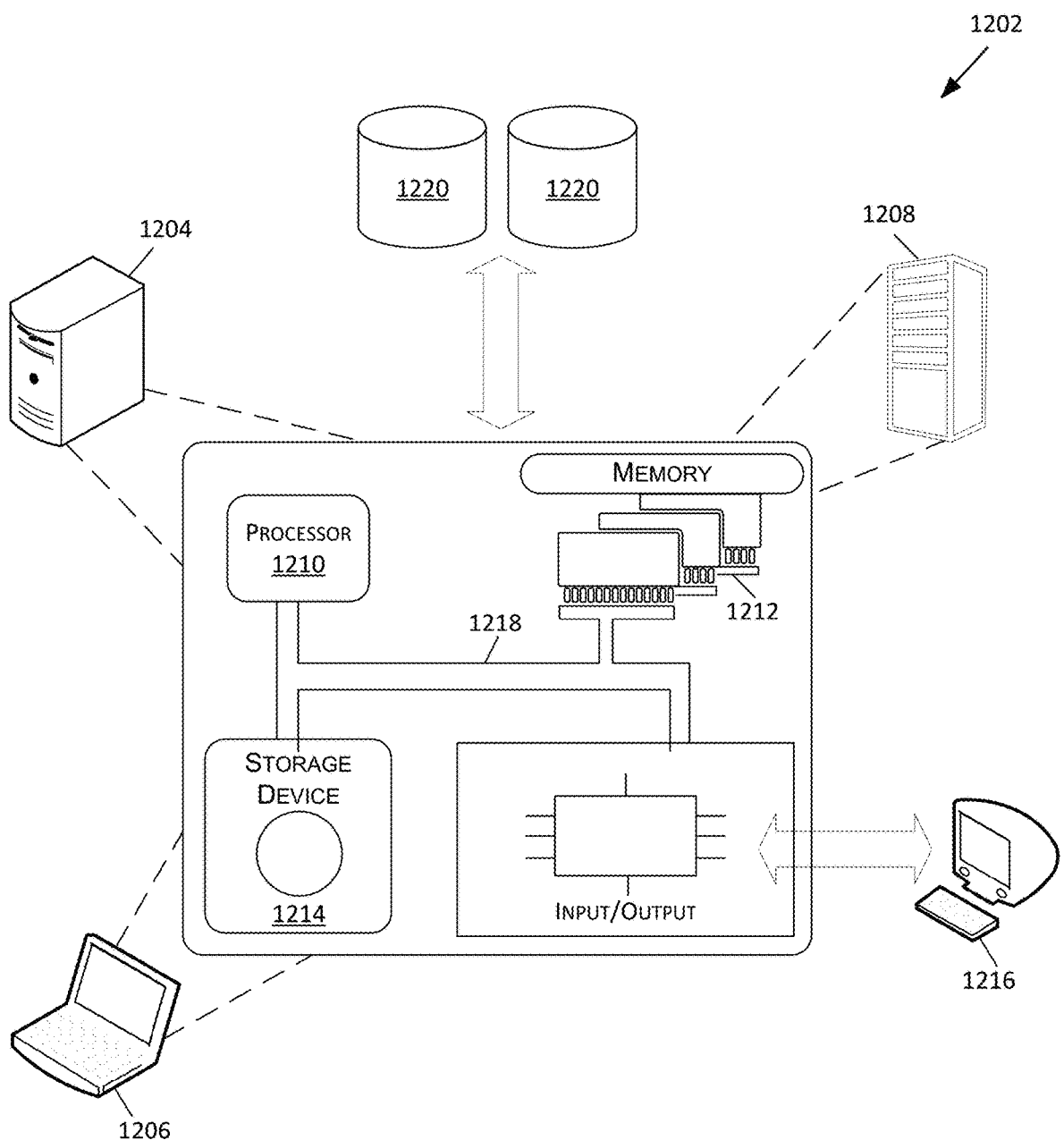
FIG. 12 is a functional block diagram of a general-purpose computing system on which the present embodiments may be implemented according to various aspects of present disclosure.

FIG. 12 is a functional block diagram of a general-purpose computing system on which the present embodiments may be implemented according to various aspects of the present disclosure. The computer system 1202 may be embodied in at least one of a personal computer (also referred to as a desktop computer) 1204, a portable computer (also referred to as a laptop or notebook computer) 1206, and/or a server 1 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1202 may execute at least some of the operations described above. The computer system 2102 may include at least one processor 1210, memory 1212, at least one storage device 1214, and input/output (I/O) devices 1216. Some or all of the components 1210, 1212, 1214, 1216 may be interconnected via a system bus 1218. The processor 1210 may be single- or multi-threaded and may have one or more cores. The processor 1210 execute instructions, such as those stored in the memory 1212 and/or in the storage device 1214. Information may be received and output using one or more I/O devices 1216.

The memory 1212 may store information, and may be a computer-readable medium, such as volatile or non-volatile memory. The storage device(s) 1214 may provide storage for the system 2102 and, in some embodiments, may be a computer-readable medium. In various aspects, the storage device(s) 1214 may be a flash memory device, a hard disk device, an optical disk device, a tape device, or any other type of storage device.

The I/O devices 1216 may provide input/output operations for the system 1202. The I/O devices 1216 may include a keyboard, a pointing device, and/or a microphone. The I/O devices 1216 may further include a display unit for displaying graphical user interfaces, a speaker, and/or a printer. External data may be stored in one or more accessible external databases 1220.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
    receiving first motion data generated by a first device;
    determining, based at least in part on the first motion data, that the first device detected first motion;
    based at least in part on the determining that the first device detected the first motion, sending first command data representing at least a first action for a second device to perform;
    receiving second motion data generated by at least one of the first device or a third device;
    determining, based at least in part on the second motion data, that the at least one of the first device or the third device detected second motion;
    determining that the second motion is associated with the first motion; and
    based at least in part on the determining that the second motion is associated with the first motion, sending second command data representing at least a second action for a fourth device to perform.

2. The method as recited in claim 1, wherein the determining that the second motion is associated with the first motion comprises determining that the second motion was detected within a predetermined period of time to the first motion.

3. The method as recited in claim 1, wherein the determining that the second motion is associated with the first motion comprises determining that the third device detected the second motion after the first device detected the first motion.

4. The method as recited in claim 1, wherein the determining that the second motion is associated with the first motion comprises:
    determining that the first motion is associated with an event; and
    determining that the second motion is also associated with the event.

5. The method as recited in claim 1, further comprising:
    determining the first action for the second device, the second device including at least one of a first speaker or a first light emitter; and
    determining the second action for the fourth device, the fourth device including at least one of a second speaker or a second light emitter.

6. The method as recited in claim 1, further comprising:
    determining the first action for the second device, the first action including at least one of emitting a first light pattern or outputting a first sound; and
    determining the second action for the fourth device, the second action including at least one of emitting a second light pattern or outputting a second sound.

7. The method as recited in claim 1, further comprising:
    receiving first data indicating that the second device is to perform the first action when the first motion is detected; and
    receiving second data indicating that the fourth device is to perform the second action when the second motion is detected and associated with the first motion.

8. The method as recited in claim 1, wherein:
    the sending of the first command data comprises sending the first command data to the second device; and
    the sending of the second command data comprises sending the second command data to the fourth device.

9. One or more devices comprising:
    one or more processors; and
    one or more computer-readable media storing instructions that, when executed by the one or more processors, cause the one or more devices to perform operations comprising:
        receiving first motion data generated by a first device;
        determining, based at least in part on the first motion data, that the first device detected first motion;
        based at least in part on the determining that the first device detected the first motion, determining a first action for a second device to perform;
        receiving second motion data generated by at least one of the first device or a third device;
        determining, based at least in part on the second motion data, that the at least one of the first device or the third device detected second motion;
        determining that the second motion is associated with the first motion; and
        based at least in part on the determining that the second motion is associated with the first motion, determining a second action for a fourth device to perform.

10. The one or more devices as recited in claim 9, wherein the determining that the second motion is associated with the first motion comprises determining that the second motion was detected within a predetermined period of time to the first motion.

11. The one or more devices as recited in claim 9, wherein the determining that the second motion is associated with the first motion comprises determining that the third device detected the second motion after the first device detected the first motion.

12. The one or more devices as recited in claim 9, wherein the determining that the second motion is associated with the first motion comprises:
- determining that the first motion is associated with an event; and
- determining that the second motion is also associated with the event.

13. The one or more devices as recited in claim 9, wherein:
- the second device includes at least one of a first speaker or a first light emitter; and
- the fourth device includes at least one of a second speaker or a second light emitter.

14. The one or more devices as recited in claim 9, the one or more computer-readable media storing further instructions that, when executed by the one or more processors, cause the one or more devices to perform further operations comprising:
- sending first command data representing the first action, the first action including at least one of emitting a first light pattern or outputting a first sound; and
- sending second command data representing the second action, the second action including at least one of emitting a second light pattern or outputting a second sound.

15. The one or more devices as recited in claim 9, the one or more computer-readable media storing further instructions that, when executed by the one or more processors, cause the one or more devices to perform further operations comprising:
- receiving first data indicating that the second device is to perform the first action when the first motion is detected; and
- receiving second data indicating that the fourth device is to perform the second action when the second motion is detected and associated with the first motion.

16. A method comprising:
- receiving first data that associates a first device with a location;
- receiving second data that associates a second device with the location;
- receiving third data indicating a first action that the first device is to perform when first motion is detected at the location; and
- receiving fourth data indicating a second action that the second device is to perform when second motion is detected at the location and the second motion is associated with the first motion.

17. The method as recited in claim 16, further comprising:
- receiving first motion data generated by a third device;
- determining, based at least in part on the first motion data, that the third device detected the first motion
- based at least in part on the determining that the third device detected the first motion, sending first command data representing the first action;
- receiving second motion data generated by a fourth device;
- determining, based at least in part on the second motion data, that the fourth device detected the second motion;
- determining that the second motion is associated with the first motion; and
- based at least in part on the determining that the second motion is associated with the first motion, sending second command data representing the second action.

18. The method as recited in claim 16, further comprising receiving fifth data indicating that the second motion is associated with the first motion when the second motion is detected within a predetermined period of time to the first motion.

19. The method as recited in claim 16, further comprising receiving fifth data indicating that the second motion is associated with the first motion when a third device detects the second motion after a fourth device detects the first motion.

20. The method as recited in claim 16, further comprising receiving fifth data indicating that the second motion is associated with the first motion when the first motion and the second motion represent a same event.

* * * * *